(12) United States Patent
Eto et al.

(10) Patent No.: US 10,315,865 B2
(45) Date of Patent: Jun. 11, 2019

(54) CONVEYING DEVICE, CONVEYING SYSTEM, AND CONVEYING METHOD

(71) Applicant: Kabushiki Kaisha Toshiba, Minato-ku (JP)

(72) Inventors: Haruna Eto, Kawasaki (JP); Takafumi Sonoura, Yokohama (JP); Hideichi Nakamoto, Setagaya (JP); Akihito Ogawa, Fujisawa (JP); Atsushi Sugahara, Kawasaki (JP); Junya Tanaka, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/900,122

(22) Filed: Feb. 20, 2018

(65) Prior Publication Data

US 2018/0178386 A1    Jun. 28, 2018

Related U.S. Application Data

(63) Continuation of application No. PCT/JP2016/083504, filed on Nov. 11, 2016.

(30) Foreign Application Priority Data

Nov. 12, 2015  (JP) ................................. 2015-222458
Sep. 12, 2016  (JP) ................................. 2016-177660

(51) Int. Cl.
*B65G 61/00*    (2006.01)
*B25J 9/16*    (2006.01)
(Continued)

(52) U.S. Cl.
CPC ............ *B65G 61/00* (2013.01); *B25J 9/1687* (2013.01); *B25J 9/1697* (2013.01); *B25J 13/08* (2013.01);
(Continued)

(58) Field of Classification Search
CPC ...................................................... B65G 61/00
See application file for complete search history.

(56) References Cited

U.S. PATENT DOCUMENTS 6,234,745 B1 *  5/2001  Pugh ...................... B65G 59/02
                                                                414/794.5
9,238,304 B1 *  1/2016  Bradski ................... B25J 9/163
(Continued)

FOREIGN PATENT DOCUMENTS

EP    2783801 A2 *  10/2014  .............. B25J 15/06
JP    8-147020 A     6/1996
(Continued)

OTHER PUBLICATIONS

International Search Report dated Feb. 14, 2017 in PCT/JP2016/083504, filed on Nov. 11, 2016(with English Translation).
(Continued)

*Primary Examiner* — Thomas Randazzo
(74) *Attorney, Agent, or Firm* — Oblon, McClelland, Maier & Neustadt, L.L.P.

(57) ABSTRACT

According to one embodiment, a conveying device includes a controller that is configured to determine a moving direction of a holder holding a first object based on a state of overlapping between the first object and a second object viewed in a conveying direction of the first object in a case where the second object is positioned in the conveying direction of the first object with respect to the first object.

14 Claims, 21 Drawing Sheets

(51) Int. Cl.
  *B65G 59/04* (2006.01)
  *B65G 67/24* (2006.01)
  *B25J 13/08* (2006.01)
  *B25J 15/06* (2006.01)
  *B25J 15/00* (2006.01)

(52) U.S. Cl.
  CPC ....... *B25J 15/0028* (2013.01); *B25J 15/0625* (2013.01); *B65G 59/04* (2013.01); *B65G 67/24* (2013.01); *G05B 2219/40006* (2013.01); *Y10S 901/09* (2013.01); *Y10S 901/31* (2013.01); *Y10S 901/40* (2013.01)

(56) References Cited

U.S. PATENT DOCUMENTS

| | | |
|---|---|---|
| 2010/0272547 A1 | 10/2010 | Cottone et al. |
| 2013/0282165 A1* | 10/2013 | Pankratov ............ G06Q 10/043 700/217 |
| 2014/0079524 A1* | 3/2014 | Shimono ................ B25J 9/1669 414/796.9 |
| 2015/0066199 A1* | 3/2015 | Shimono ................ B65G 59/04 700/218 |
| 2016/0347558 A1 | 12/2016 | Eto et al. |

FOREIGN PATENT DOCUMENTS

| | | | |
|---|---|---|---|
| JP | 2001-317911 | 11/2001 | |
| JP | 2001317911 A * | 11/2001 | ............ G01B 11/00 |
| JP | 3444171 | 9/2003 | |
| JP | 2013-154457 | 8/2013 | |
| JP | 2014-50936 | 3/2014 | |
| JP | 2014-61560 | 4/2014 | |
| JP | 2015-47681 | 3/2015 | |
| JP | 2016-222377 | 12/2016 | |
| JP | 2018-47544 A | 3/2018 | |

OTHER PUBLICATIONS

Written Opinion dated Feb. 14, 2017 in PCT/JP2016/083504, filed on Nov. 11, 2016.

\* cited by examiner

CONVEYING DEVICE, CONVEYING SYSTEM, AND CONVEYING METHOD

CROSS-REFERENCE TO RELATED APPLICATION

This is a Continuation Application of International Application PCT/JP2016/083504, filed on Nov. 11, 2016, which claims priority to Japanese Patent Application No. 2015-222458, filed Nov. 12, 2015 and Japanese Patent Application No. 2016-177660, filed Sep. 12, 2016, and the entire contents of all of which are incorporated herein by reference.

FIELD

Embodiments described herein relate generally to a conveying device, a conveying system, and a conveying method.

BACKGROUND

A conveying device that takes objects out of a palette is known.

There is a case in which a conveying device has difficulties in taking out objects at a high speed.

DETAILED DESCRIPTION

Figure 1:
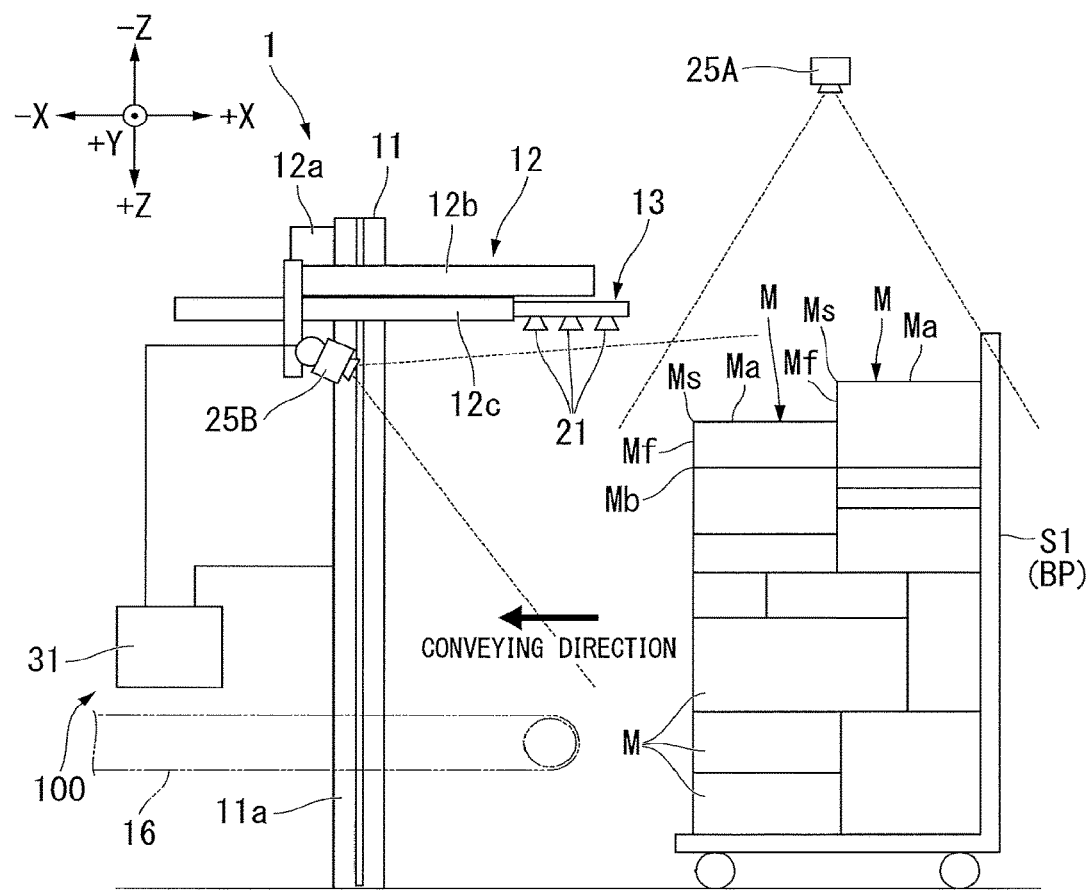
FIG. 1 is a side view showing a conveying device according to a first embodiment.

According to one embodiment, a conveying device includes a controller that is configured to determine a moving direction of a holder holding a first object based on a state of overlapping between the first object and a second object viewed in a conveying direction of the first object in a case where the second object is positioned in the conveying direction of the first object with respect to the first object.

Hereinafter, a conveying device, a conveying system, and a conveying method according to embodiments will be described with reference to the drawings. In the following description, constituent elements having the same or similar functions will be denoted by the same reference numerals. A redundant description of these constituent elements may be omitted.

First Embodiment

A first embodiment will be described with reference to FIGS. 1 to 12.

FIG. 1 shows a conveying device 1 according to the present embodiment.

As shown in FIG. 1, the conveying device 1 is an automatic unloading device, for example. The conveying device 1 is provided between a first mounting region S1 and a second mounting region (not shown). The conveying device 1 takes out an object (a conveying target object, a holding target object) M placed in the first mounting region S1 and moves the object M to the second mounting region. A plurality of objects M which are different in size, shape, and the like, for example, are placed irregularly in the first mounting region S1. The conveying device 1 may be referred to as a "cargo handling device". However, the object M conveyed by the conveying device 1 is not limited to a packaged load and may be components in a production line and the like. The object M is not limited to a parallelepiped object and the shape thereof is not particularly limited. For example, the object M may be an object having a trapezoidal shape and may be an object having round portions. The conveying device, the conveying system, and the conveying method of the present embodiment can be broadly applied to an automatic input device for logistics, an object supply device in plants, and the like.

The expression "mounting region" mentioned in the specification broadly means a place where objects are placed and is not limited to a region having a specific shape or a specific function. Moreover, the expression "placed (or positioned) in the mounting region" mentioned in the specification means a case in which an object is placed directly on a mounting surface of a mounting region and a case in which an object is placed on an object which has been previously placed on the mounting surface. The "mounting region" mentioned in the specification may be referred to as a "stacking portion" or a "stacking region". However, the expression "stacking" mentioned in the specification means a case in which a plurality of objects are stacked on top of each other and a case in which a plurality of objects are arranged on a flat plane. In the present embodiment, the first mounting region S1 is a box palette BP, for example. An example of the box palette BP is a roll box palette (RBP) having wheels. On the other hand, the second mounting region is a belt conveyor, for example. The conveying device 1 and the belt conveyor are fixed on a floor surface. However, the conveying device 1 may be movable with the aid of wheels, rails, or the like. The first mounting region S1 and the second mounting region each are not limited to the above-mentioned examples and each may be any one of a belt conveyor, a truck, a palette, a workbench, and the like.

Here, for the sake of convenience, the directions +X, −X, +Y, −Y, +Z, and −Z are defined. The directions +X, −X, +Y, and −Y are directions extending along an substantially horizontal plane, for example. The +X direction is a direction extending from the conveying device 1 to the first mounting region S1. The +X direction may be referred to as an "approaching direction". The −X direction is the opposite direction to the +X direction. The −X direction is a conveying direction of the object M. The "conveying direction of object" mentioned in the specification is a direction in which the object M taken out of the mounting region S1 is conveyed toward the conveying device 1. The +Y direction is a direction (for example, a substantially orthogonal direction) crossing the +X direction and may be a width direction of the object M, for example. The −Y direction (see FIG. 5) is the opposite direction to the +Y direction. The +Z direction is a direction (a substantially orthogonal direction) crossing the +X and +Y directions and may be a substantially vertically downward direction, for example. The −Z direction is the opposite direction to the +Z direction and may be a substantially vertically upward direction, for example. Moreover, in the following description, in relation to the direction (for example, the +X direction) extending from the conveying device 1 toward the first mounting region S1, the upstream side is referred to as "front", the downstream side is referred to as "rear", the left side is referred to as "left", and the right side is referred to as "right".

As shown in FIG. 1, the conveying device 1 includes a base 11, an arm 12, a holder (a gripper) 13, a detector 14 (see FIG. 3), a controller 15 (see FIG. 3), and a conveyor 16.

The base (a body frame) 11 is provided on a floor surface. The base 11 includes a column 11a extending in the −Z axis and is formed in a frame shape, for example.

The arm (an arm device) 12 is an orthogonal robot arm, for example, and is an example of an articulated arm. The arm 12 is connected to the base 11. For example, the arm 12 includes a first member 12a, a second member 12b, and a third member 12c. The first member 12a is guided by a guide provided on the column 11a of the base 11 and can move in the +Z and −Z directions. The second member 12b is supported by and guided by the first member 12a and can move in the +Y and −Y directions. The third member 12c is supported by and guided by the second member 12b and can move in the +X and −X directions. The holder 13 to be described later is attached to a distal end of the arm 12. The arm 12 moves the holder 13 to a desired position in the +X, −X, +Y, −Y, +Z, and −Z directions. The "arm" mentioned in the specification broadly means a member that moves the holder 13 to a desired position and is not necessarily limited to a rod-shaped member. The arm 12 may be referred to as a "driving unit", a "moving mechanism", or a "holder moving mechanism" that moves the holder 13.

The holder 13 is an end effector that can hold the object M. An example of the holder 13 includes a plurality of sucking disks 21 connected to a vacuum pump and a solenoid valve that controls a sucking operation of the sucking disks 21. The holder 13 holds (grips) the object M by vacuum-sucking the sucking disks 21 in contact with the object M. The expression "gripping" mentioned in the specification is used in a broad sense meaning "holding an object" and is not limited to meaning "grasping". The holder 13 is disposed to face an opening side of the box palette BP that is an example of the first mounting region S1. The holder 13 is moved toward the first mounting region S1 by the arm 12 and holds the object M placed in the first mounting region S1. Moreover, the holder 13 is moved by the arm 12 to convey the object M held therein toward the second mounting region.

Figure 2:
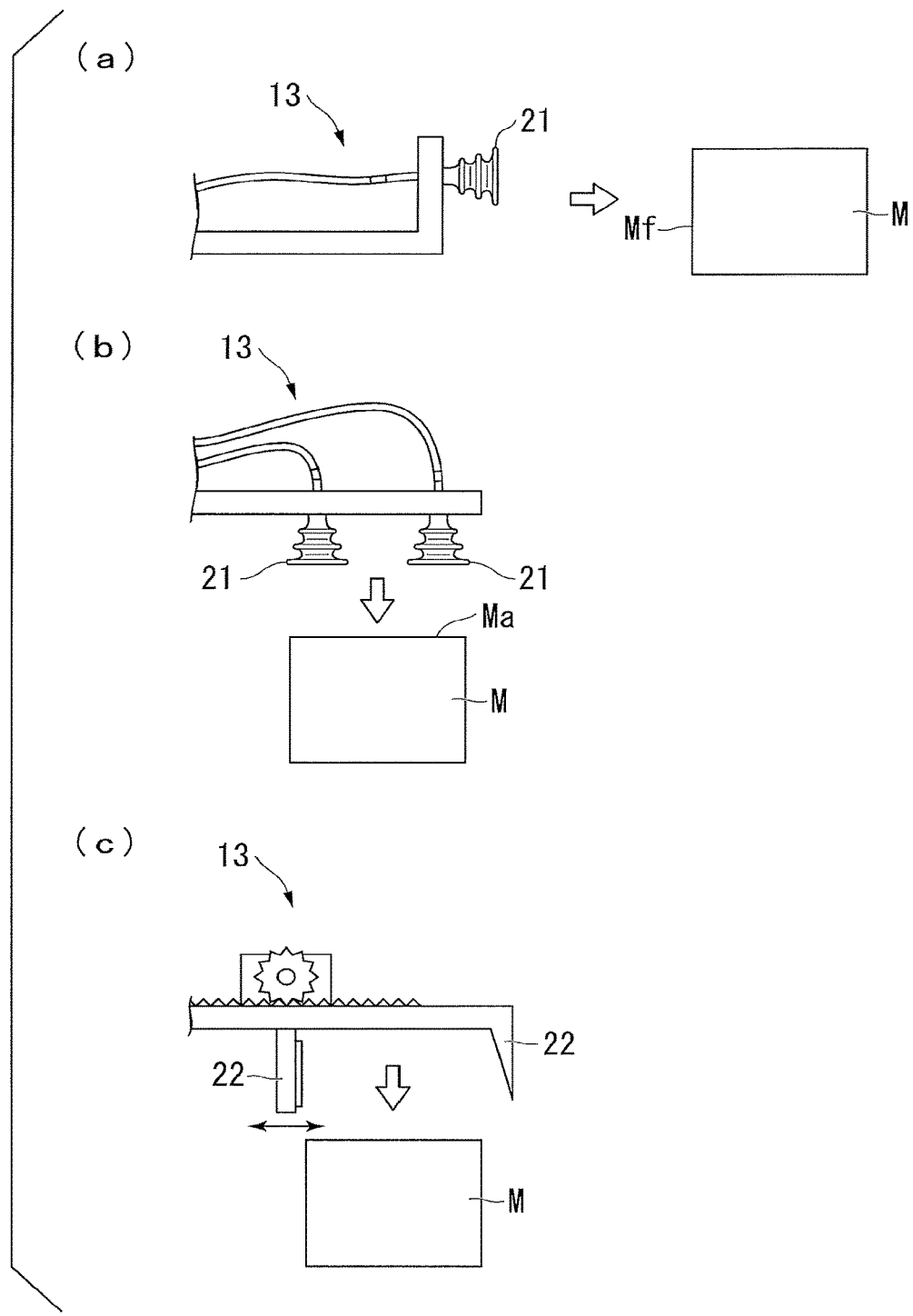
FIG. 2 is a side view showing configuration examples of a holder according to the first embodiment.

FIG. 2 shows several configuration examples of the holder 13.

In the example shown in (a) in FIG. 2, the holder 13 has the sucking disk 21 capable of sucking an end surface (a front surface) Mf of the object M. In the example shown in (b) in FIG. 2, the holder 13 has the sucking disks 21 capable of sucking a top surface Ma of the object M. The "top surface" mentioned in the specification means an upper surface at the highest position on the object M. Moreover, the "top surface" mentioned in the specification is not limited to a geometric flat surface. The "top surface" mentioned in the specification may be a curved surface and may be an uneven surface. In other words, the "top surface" means a holding region that can be held by the holder 13 that approaches the object from one direction.

In the example shown in (c) in FIG. 2, the holder 13 has a plurality of supports 22 that sandwich the object M. That is, the holder 13 is not limited to a member having a sucking mechanism and may be a member that holds the object M by sandwiching the object M. The configuration of the holder 13 is not limited to these configuration examples.

Here, the conveyor 16 will be described first.

As shown in FIG. 1, the conveyor 16 is provided on the base 11. The conveyor 16 may be movable in the +Z and −Z directions along the column 11a of the base 11. The conveyor 16 is a belt conveyor, for example, and is not limited thereto. The conveyor 16 may be a roller conveyor including a plurality of rollers that rotates actively. The object M conveyed after being taken out of the first mounting region S1 by the holder 13 is stacked on the conveyor 16. That is, the conveyor 16 receives, from the holder 13, the object M conveyed by the holder 13, conveys the object M in the −X direction, and moves the object M toward the second mounting region. The conveyor 16 may be omitted. In this case, the object M may be moved directly to the second mounting region by the arm 12 and the holder 13.

Next, the detector 14 will be described.

The detector 14 is an example of an "information acquirer". The detector 14 acquires information related to at least a first object and a second object to be described later. The detector 14 acquires information related to a plurality of objects M including a first object, a second object, and a third object, for example. The "information related to objects" mentioned in the specification is, for example, information for recognizing the position of the object M placed in the first mounting region S1 (for example, at least one of: the position of the object M in the conveying direction; the position of the top surface Ma of the object M; and the position of a front edge Ms of the object M in the conveying direction). The "information related to objects" may include information on a stacking state of the objects M, such as, for example, the sizes of the objects M and a stacking order of the objects M.

In the present embodiment, the detector 14 includes a sensor such as a camera. The detector 14 acquires information (for example, information captured by a camera) obtained by directly detecting the object M as the information related to the object M. The "information acquirer" mentioned in the specification is not limited to a sensor such as a camera. The "information acquirer" mentioned in the specification may be an information acquirer that acquires information related to the object M by receiving information from a database in which the information related to the object M is stored. Moreover, the "information acquirer" mentioned in the specification may be a sensor or the like that is provided separately from the conveying device 1 to detect the state during loading of the objects M (for example, during loading of the objects M in the first mounting region S1). The information acquirer that acquires the information related to the object M by receiving the information from the database will be described in detail in a modification to be described later.

Figure 3:
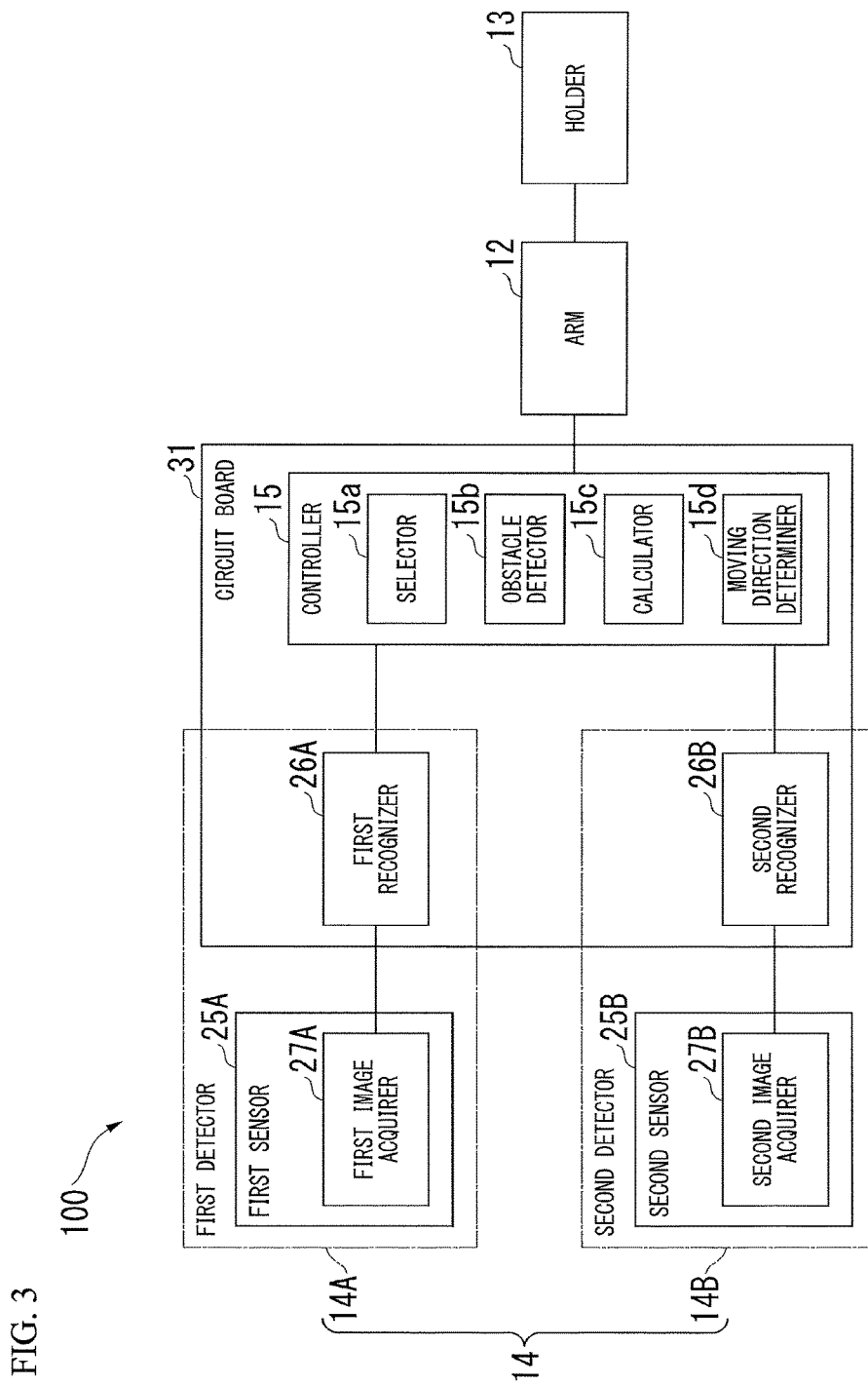
FIG. 3 is a block diagram showing a system configuration of the conveying device according to the first embodiment.

FIG. 3 is a block diagram showing a system configuration of the conveying device 1.

As shown in FIG. 3, the detector 14 includes a first detector 14A and a second detector 14B.

The first detector 14A detects a plurality of objects M placed in the first mounting region S1. For example, the first detector 14A detects information related to an entire arrangement (the stacking state) of the plurality of objects M placed in the first mounting region S1. More specifically, the first detector 14A includes a first sensor 25A and a first recognizer 26A.

The first sensor 25A includes a first image acquirer 27A that acquires image data of the plurality of objects M. The first sensor 25A is a camera that images the first mounting region S1 from an upper side, for example (see FIG. 1). For example, the first sensor 25A is an infrared dot pattern projection camera capable of measuring 3-dimensional positions. The infrared dot pattern projection camera captures an infrared image of a target object in a state of projecting an infrared dot pattern to the target object. The first sensor 25A transmits the acquired data to the first recognizer 26A. The first sensor 25A may be an optical camera or may be a sensor other than a camera.

The first recognizer (a first analyzer) 26A is realized by a part of circuitry included in a circuit board 31 to be described later, for example. For example, the first recognizer 26A may be a software functional unit realized when a processor such as a central processing unit (CPU) executes a program stored in a memory of the circuit board 31. Alternatively, the first recognizer 26A may be realized by hardware such as a large scale integration (LSI), an application specific integrated circuit (ASIC), or a field-programmable gate array (FPGA) mounted on the circuit board 31. Moreover, the first functional unit 26A may be realized by a combination of a software functional unit and hardware. The first recognizer 26A detects the position information of a plurality of objects M on the basis of the data acquired by the first sensor 25A. The position information of the plurality of objects M includes information on the position of an end (an edge) of an outer shape of each object M and the height position of the top surface Ma of each object M, for example. The "height (or height position) of the top surface of the object" mentioned in the specification means the height (absolute height) from a predetermined reference surface (for example, a floor surface or a mounting surface of the mounting region) to the top surface of each object stacked in the mounting region. Moreover, the first recognizer 26A detects the position of the front edge Ms (see FIG. 1) of each object M on the basis of the data acquired by the first sensor 25A. The front edge Ms of each object M is an edge (an edge facing the downstream side) on the downstream side of the object M in the conveying direction of the object M. For example, the front edge Ms is an edge on the −X direction side among the edges that define the outline of the top surface Ma of the object M. In other respects, the front edge Ms is an edge that defines a portion of the outline of the end surface (a front surface) Mf of the object M facing the downstream side in the conveying direction. The front edge Ms is an example of the "downstream side end of the object in the conveying direction". The end is not limited to an end having a corner and may be a round end. The "downstream side end of the object in the conveying direction" mentioned in the specification means a portion of the object positioned closest to the downstream side in the conveying direction.

On the other hand, the second detector 14B detects a lower end of the object M raised by the holder 13 and the information related to surroundings of the lower end. More specifically, as shown in FIG. 3, the second detector 14B includes a second sensor 25B and a second recognizer 26B.

The second sensor 25B includes a second image acquirer 27B that acquires image data of the plurality of objects M. The second sensor 25B is a camera that is provided on the base (the root) of the arm 12, for example, to image the first mounting region S1 from an obliquely upper side (see FIG. 1). The second sensor 25B images the plurality of stacked objects M so that the objects M are included in a visual field viewed in a horizontal direction. The second sensor 25B is an infrared dot pattern projection camera, for example, similarly to the first sensor 25A. The second sensor 25B may be an optical camera or may be a sensor other than a camera. Moreover, if the second sensor 25B is provided so that the angle of view faces slightly downward and the entire arrangement of the plurality of objects M can be acquired by the second sensor 25B, for example, the first sensor 25A may be omitted.

The second recognizer (a second analyzer) 26B is realized by a part of circuitry included in the circuit board 31 to be described later similarly to the first recognizer 26A. For example, the second recognizer 26B may be a software functional unit realized when a processor such as a CPU executes a program stored in a memory of the circuit board 31. Alternatively, the second recognizer 26B may be realized by hardware such as LSI, ASIC, or FPGA mounted on the circuit board 31. Moreover, the second recognizer 26B may be realized by a combination of a software functional unit and hardware. The second recognizer 26B detects the position of the bottom side (a bottom surface) Mb (see FIG. 9) of the object M raised by the holder 13 on the basis of the data acquired by the second sensor 25B. Moreover, the second recognizer 26B detects a positional relation between the position of the bottom side (or the bottom surface) Mb of the object M raised by the holder 13 and objects M positioned around the object M on the basis of the data acquired by the second sensor 25B. The "bottom surface" mentioned in the specification means a lower surface positioned at the lowest position on the object M. The "bottom surface" mentioned in the present specification is not limited to a geometric flat surface. The "bottom surface" mentioned in the specification may be a curved surface and may be an uneven surface. Moreover, the "bottom side" mentioned in the specification means a side that defines the outline of the bottom surface of the object M.

For example, during the holder 13 performs an operation of raising the object M, the second recognizer 26B monitors a change in the data of the designated (set) absolute height on the basis of real-time data acquired by the second sensor 25B. The second recognizer 26B detects that the bottom side (the bottom surface) Mb of the object M raised by the holder 13 has moved above the designated absolute height by detecting that the 3-dimensional measurement data acquired by the second sensor 25B is discontinuous, for example.

The controller (a control circuit) 15 controls an entire operation of the conveying device 1. That is, the controller 15 controls various operations of the arm 12, the holder 13, and the detector 14. As shown in FIG. 3, the controller 15 is realized by the entire portion or a partial portion of the circuit board (a control board) 31 including a processor such as a CPU. For example, the controller 15 is a software functional unit realized when a processor such as a CPU executes a program stored in a memory of the circuit board 31. Alternatively, the controller 15 may be realized by hardware such as LSI, ASIC, or FPGA mounted on the circuit board 31. Moreover, the controller 15 may be realized by a combination of a software functional unit and hardware. The first recognizer 26A, the second recognizer 26B, and the controller 15 may be integrally realized by a single chip component and may be separately realized by two or more chip components.

The controller 15 moves the holder 13 by controlling the arm 12. For example, the controller 15 causes the holder 13 to approach the first mounting region S1 in the +X direction. Moreover, the controller 15 controls the holder 13 so that the object M is held by the holder 13. The controller 15 controls the arm 12 in a state in which the holder 13 and the object M can be regarded as a single member so that the object M held by the holder 13 is raised in the −Z direction. The controller 15 moves the holder 13 in the −X direction so that the object M is taken out of the first mounting region S1. The controller 15 includes a selector 15a, an obstacle detector 15b, a calculator 15c, and a moving direction determiner 15d as functional units related to control of the arm 12. The functions of the selector 15a, the obstacle detector 15b, the calculator 15c, and the moving direction determiner 15d will be described in the following description of the conveying method.

Here, the controller 15 of the present embodiment performs an operation of avoiding an obstacle present in the first mounting region S1 after the object M is held by the holder 13. On the basis of an overlapping width in a first direction between a first object and a second object on a projection plane seen in a direction substantially parallel to the conveying direction of the object M and an overlapping width in a second direction crossing the first direction between the first object and the second object on the projection plane, the controller 15 of the present embodiment determines a moving direction of the holder 13 that holds the first object based on the information acquired by the information acquirer (for example, the detector 14). Hereinafter, an example of the conveying method for conveying the object M including an avoiding operation will be described. The configuration of the present embodiment is not limited to the following example.

Figure 4:
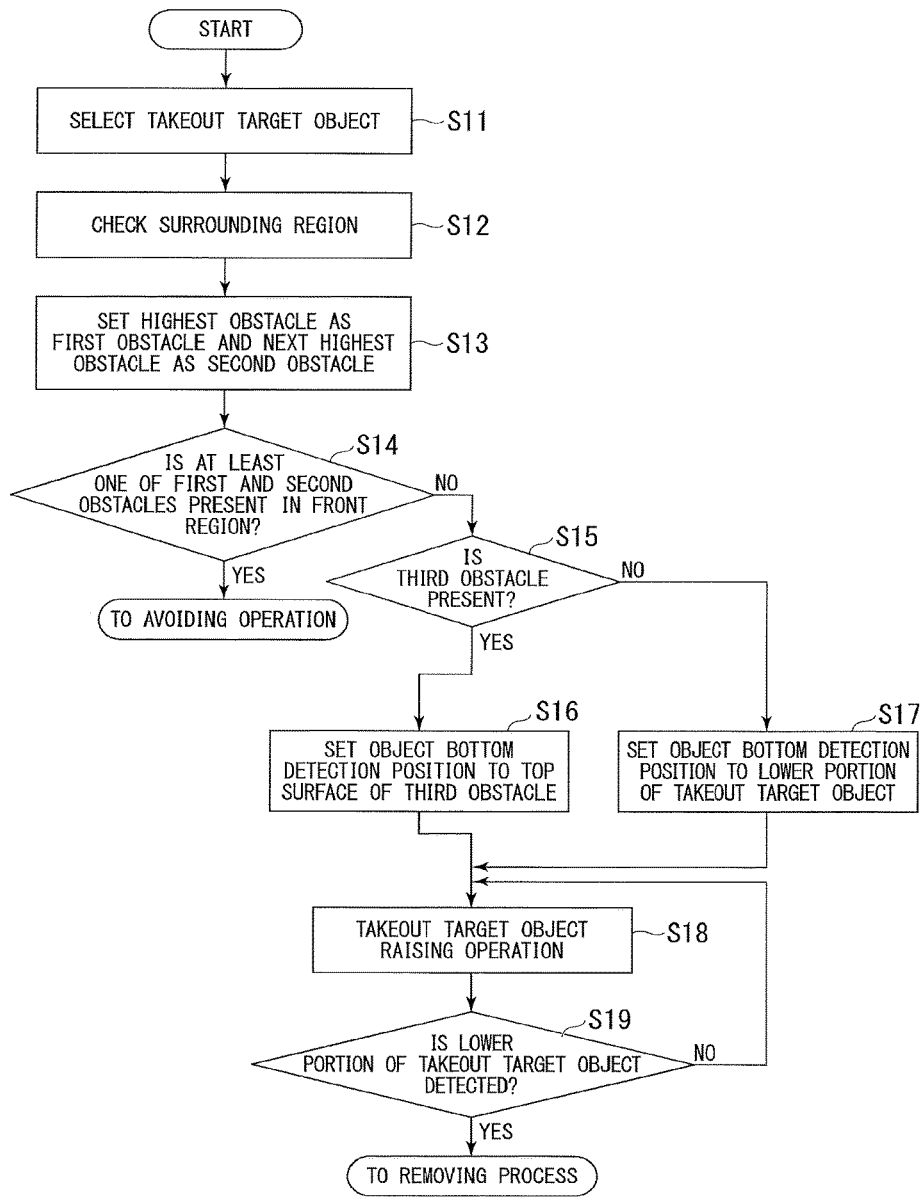
FIG. 4 is a flowchart showing an example of a flow of a conveying method according to the first embodiment.

FIG. 4 is a flowchart showing an example of a conveying method of the present embodiment.

First, as shown in FIG. 4, the selector 15a of the controller 15 selects a takeout target object (a holding target object, a gripping target object) OM held by the holder 13 (step S11). That is, the selector 15a of the controller 15 selects the takeout target object OM among the plurality of objects M (the plurality of objects M placed in the first mounting region S1) detected by the detector 14 on the basis of the detection result of the detector 14 (the recognition information obtained by recognizing the positions of the plurality of objects M). The "detection result of the detector 14" mentioned in the specification is an example of "information acquired by the information acquirer". Moreover, the takeout target object OM is an example of the "first object". The "takeout target object" mentioned in the specification means an object of which the priority order (priority order of conveyance) for being taken out by the conveying device 1 at a certain time point is the highest. In the present embodiment, the selector 15a of the controller 15 selects an object M having the top surface Ma at the highest position among the plurality of objects M detected by the detector 14 as the takeout target object OM. The expression "having the top surface at a certain height position" mentioned in the specification means that the top surface is positioned at a certain height in relation to a predetermined reference surface (for example, the floor surface or the mounting surface of the mounting region) as described above. The selector 15a of the controller 15 calculates a region (a holdable portion) that can be held by the holder 13, of the surface of the takeout target object OM on the basis of the detection result obtained by the detector 14 and determines a holding target position of the holder 13. In some drawings to be described below, the takeout target object OM is hatched for the sake of convenience.

Subsequently, the obstacle detector 15b of the controller 15 detects an obstacle with respect to the takeout target object OM (step S12). That is, the obstacle detector 15b of the controller 15 detects the presence of an obstacle with which contact is to be avoided in conveyance of the takeout target object OM on the basis of the detection result of the detector 14. The "obstacle" mentioned in the specification includes a portion (for example, a basket frame of the box palette BP) of a member that forms the first mounting region S1 and an object M which is not selected as the takeout target object OM among the plurality of objects M detected by the first detector 14A. In other words, an object M that overlaps (interferes with) the takeout target object OM in the conveying direction of the object M corresponds to an example of an obstacle.

Figure 5:
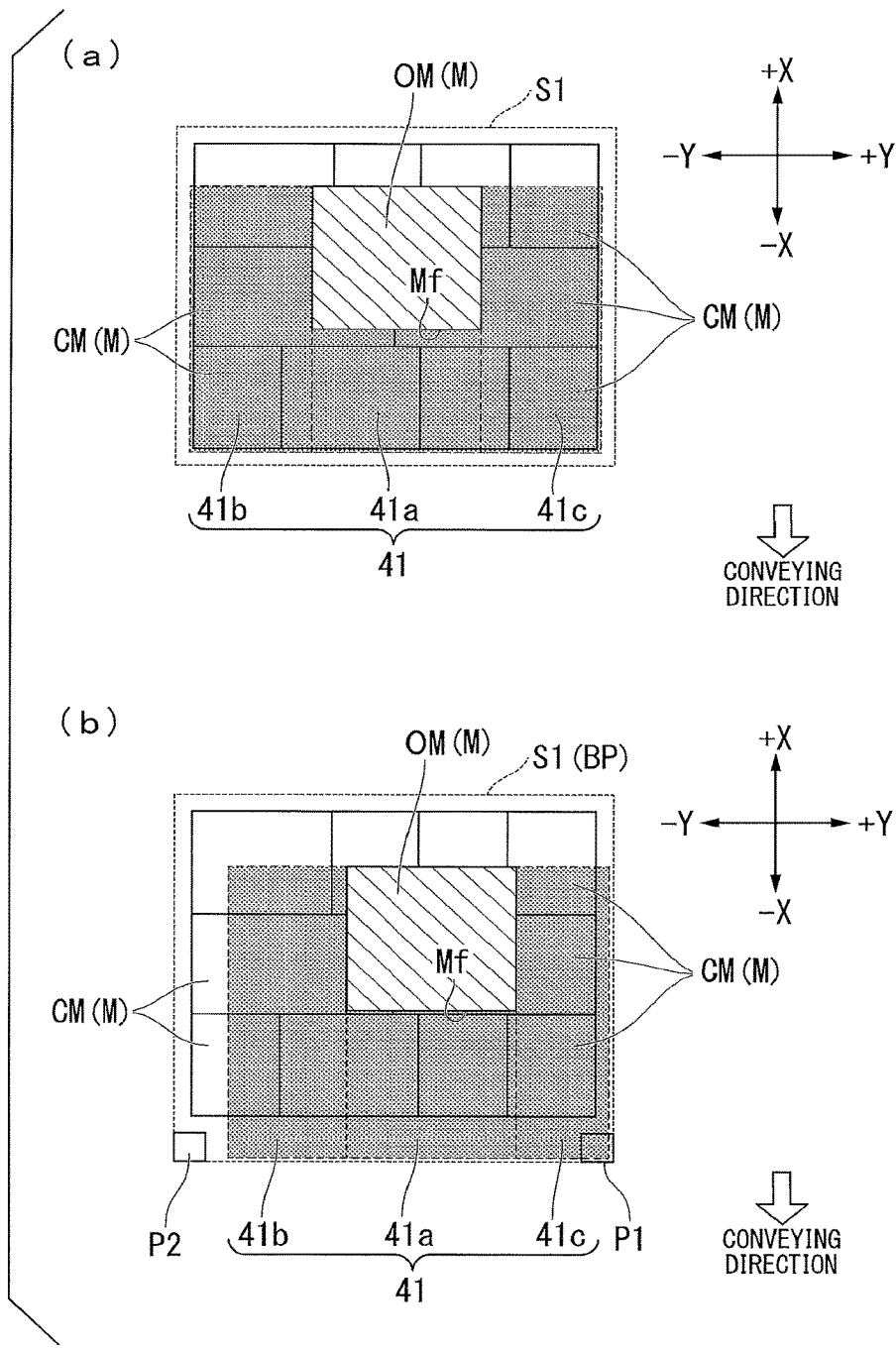
FIG. 5 is a plan view showing an example of a check region according to the first embodiment.

Here, FIG. 5 shows an example of an obstacle check region 41 set by the obstacle detector 15b of the controller 15. (a) in FIG. 5 shows a case in which a member serving as an obstacle is not present other than objects M. On the other hand, (b) in FIG. 5, shows a case in which a member (for example, poles P1 and P2 which are part of a basket frame of the box palette BP) serving as an obstacle is present in the first mounting region S1 in addition to objects M.

As shown in FIG. 5, the obstacle detector 15b of the controller 15 sets the check region 41 as a region in which the presence of an obstacle is detected. The check region 41 is an example of a "surrounding region" of the takeout target object OM. The check region 41 includes a front region (a first region) 41a, a left region (a second region) 41b, and a right region (a third region) 41c.

In the example shown in (a) in FIG. 5, the check region 41 covers an substantially entire part of the first mounting region S1 in the +Y and −Y directions. In this example, the front region 41a extends between an end surface (a front surface) Mf on the −X side of the takeout target object OM and an end (a front end) on the −X direction side of the first mounting region S1. On the other hand, the left region 41b extends between an end surface (a left side surface) on the −Y direction side of the takeout target object OM and an end (a left end) on the −Y direction side of the first mounting region S1. The right region 41c extends between an end surface (a right side surface) on the +Y direction side of the takeout target object OM and an end (a right end) on the +Y direction side of the first mounting region S1. The left region 41b and the right region 41c extend in the +X direction between the end (the front end) on the −X direction side of the first mounting region S1 and the position corresponding to the end surface (the rear surface) on the +X direction side of the takeout target object OM.

On the other hand, in the example shown in (b) in FIG. 5, the first mounting region S1 has a pair of poles P1 and P2 of the box palette BP as obstacles with respect to the takeout target object OM. The pair of poles P1 and P2 are positioned at the ends on the −X direction side of the first mounting region S1 and separated from each other at both ends in the +Y and −Y directions. The poles P1 and P2 include portions positioned above the top surface Ma of the takeout target object OM. The check region 41 is set to such a size that includes the pole closer to the takeout target object OM among the pair of poles P1 and P2 and does not include the pole distant from the takeout target object OM. In this example, the front region 41a extends between the end surface (the front surface) Mf on the −X direction side of the takeout target object OM and the end (the front end) on the −X direction side of the first mounting region S1. The left region 41b is a smaller one of: a region which extends a predetermined distance from the end surface (the left side surface) on the −Y direction side of the takeout target object OM; and a region between the end surface (the left side surface) on the −Y direction side of the takeout target object OM and the end (the left end) on the −Y direction side of the first mounting region S1. Moreover, the right region 41c is a smaller one of: a region which extends a predetermined distance from the end surface (the right side surface) on the +Y direction side of the takeout target object OM; and a region between the end surface (the right side surface) on the +Y direction side of the takeout target object OM and the end (the right end) on the +Y direction side of the first mounting region S1. The size of the left region 41b and the right region 41c of the check region 41 is set appropriately on the basis of the size or the like of the object M placed in the first mounting region S1. The left region 41b and the right region 41c extend in the +X direction between the end (the left end) on the −X direction side of the first mounting region S1 and the position corresponding to the end surface (the rear surface) on the +X direction side of the takeout target object OM.

A member serving as an obstacle such as a pole or a fence for fall prevention can be detected by a detector that is the same as a detector (for example, the detector 14) for detecting the object M. In this case, although a state in which the top surface of a pole cannot be detected because it exceeds the detection range limit of the detector may occur, when a detection target is present at an upper edge of a detection range, it is defined in a simplified manner such that the top surface of the detection target is infinitely high above thereof, and the detection target is registered as a highest object (obstacle) and is easily compared with another object (for example, a conveying target object OM and an objects M serving as obstacles). Alternatively, a member serving as an obstacle such as a pole or a fence for fall prevention may be detected, for example, by the obstacle detector 15b by using member information including a top surface height, registered in advance in a database (for example, a database DB, see FIG. 22).

In other words, as shown in FIG. 5, the front region 41a is positioned in the conveying direction of the takeout target object OM in relation to the takeout target object OM. The left region 41b and the right region 41c are positioned on both sides of the takeout target object OM and on both sides of the front region 41a in a direction crossing the conveying direction of the takeout target object OM. The left region 41b and the right region 41c are examples of a "side region". Moreover, in the specification, an object M placed in the front region 41a, the left region 41b, and the right region 41c is referred to as a "surrounding object CM".

As shown in FIG. 4, the obstacle detector 15b of the controller 15 sets first and second obstacles 51 and 52 (see FIG. 6) among the obstacles positioned in the check region 41 on the basis of the detection result of the detector 14 (step S13). For example, the obstacle detector 15b of the controller 15 sets an object M having the top surface Ma at the highest position among the objects M (the surrounding objects CM) positioned in the check region 41 as the first obstacle 51. In other words, the obstacle detector 15b of the controller 15 sets an object M having the top surface Ma at the next highest position after the takeout target object OM among the surrounding objects CM as the first obstacle 51. The object M set as the first obstacle 51 is an example of a "second object". Moreover, when the pole P1 (or the pole P2) of the box palette BP positioned in the check region 41 is detected by the detector 14, the obstacle detector 15b of the controller 15 sets the pole P1 (or the pole P2) as the first obstacle 51.

The obstacle detector 15b of the controller 15 sets an obstacle having the top surface at the second highest position among the obstacles positioned in the check region 41 as the second obstacle 52. For example, the obstacle detector 15b of the controller 15 sets an object M having the top surface Ma at the next highest position after the first obstacle 51 among the surrounding objects CM as the second obstacle 52. An object M set as the second obstacle 52 is an example of a "third object". Moreover, when the pole P1 (or the pole P2) is set as the first obstacle 51, the obstacle detector 15b of the controller 15 sets an object M having the top surface Ma at the highest position among the surrounding objects CM as the second obstacle 52. The first and second obstacles 51 and 52 have the top surface Ma at a higher position than the bottom surface Mb of the takeout target object OM.

Subsequently, as shown in FIG. 4, the obstacle detector 15b of the controller 15 determines whether at least one of the first and second obstacles 51 and 52 is present in the front region 41a on the basis of the detection result of the detector 14 (step S14).

Figure 6:
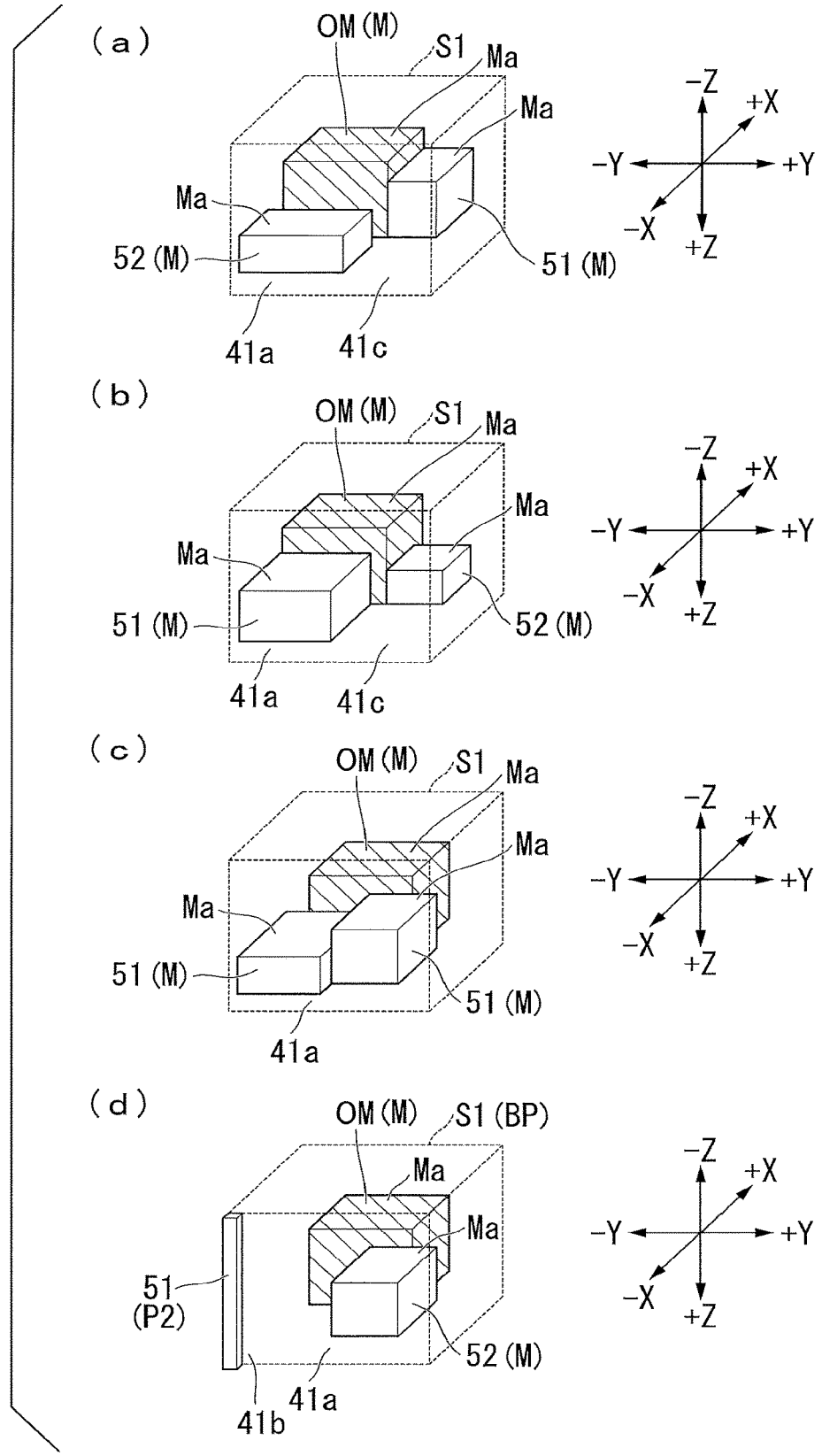
FIG. 6 is a perspective view showing examples of a stacking state of objects according to the first embodiment.
Figure 7:
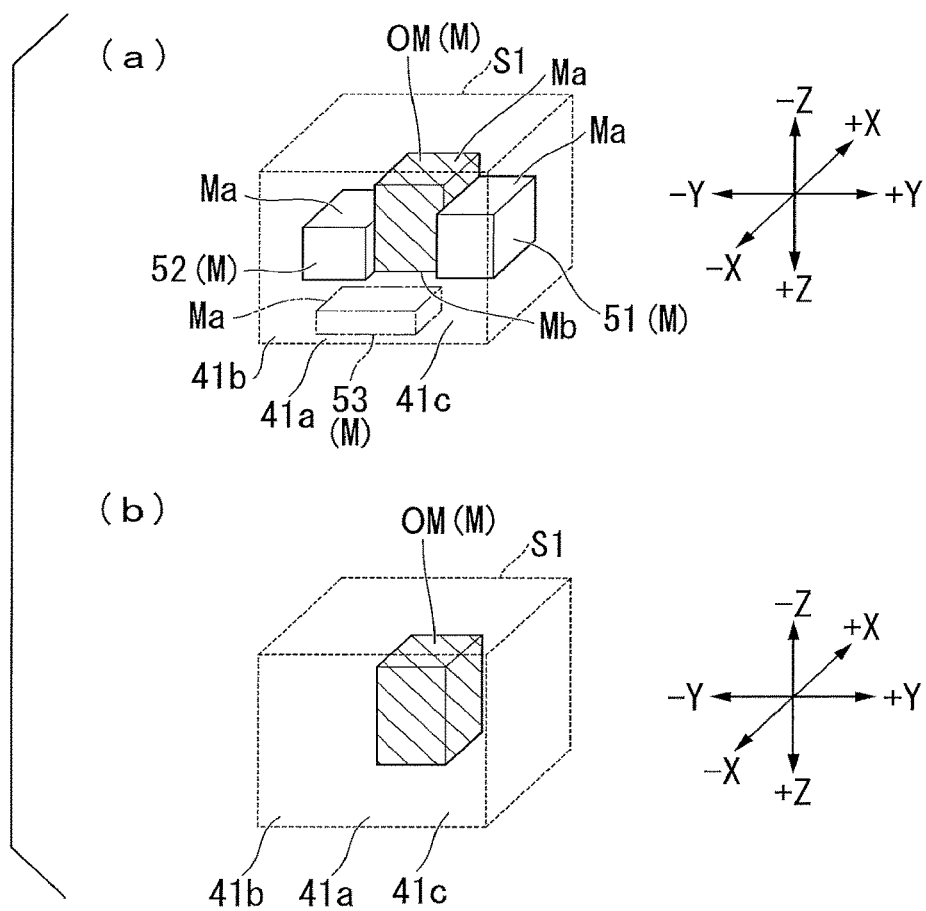
FIG. 7 is a perspective view showing examples of a stacking state of objects according to the first embodiment.

Here, FIGS. 6 and 7 show examples of the stacking state of the first and second obstacles 51 and 52.

FIG. 6 shows an example in which at least one of the first and second obstacles 51 and 52 is positioned in the front region 41a. For example, in (a) in FIG. 6, the first obstacle 51 is positioned in the right region 41c, and the second obstacle 52 is positioned in the front region 41a. In (b) in FIG. 6, the first obstacle 51 is positioned in the front region 41a, and the second obstacle 52 is positioned in the right region 41c. In (c) in FIG. 6, both the first and second obstacles 51 and 52 are positioned in the front region 41a. In (d) in FIG. 6, the pole P2 of the box palette BP as the first obstacle 51 is positioned in the left region 41b and the second obstacle 52 is positioned in the front region 41a.

On the other hand, FIG. 7 shows an example in which both the first and second obstacles 51 and 52 are not present in the front region 41a. For example, in (a) in FIG. 7, the first obstacle 51 is positioned in the right region 41c and the second obstacle 52 is positioned in the left region 41b. In (b) in FIG. 7, both the first and second obstacles 51 and 52 are not present.

As shown in FIG. 4, when at least one of the first and second obstacles 51 and 52 is present in the front region 41a (step S14: YES), the controller 15 performs an avoiding operation of avoiding the first and second obstacles 51 and 52. The avoiding operation will be described later. On the other hand, when both the first and second obstacles 51 and 52 are not present in the front region 41a (step S14: NO), the obstacle detector 15b of the controller 15 determines whether a third obstacle 53 (see (a) in FIG. 7) is present in the front region 41a (step S15). The third obstacle 53 is an object M having the top surface Ma at the next highest position after the first and second obstacles 51 and 52 among the obstacles present in the front region 41a. The third obstacle 53 has the top surface Ma at a higher position than the bottom surface Mb of the takeout target object OM.

When the third obstacle 53 is present in the front region 41a (step S15: YES), the controller 15 sets an object bottom detection position to the height of the top surface Ma of the third obstacle 53 (step S16). The "object bottom detection position" is a target position at which a change in 3-dimensional measurement data is monitored by the second detector 14B. By setting the object bottom detection position to the height of the top surface Ma of the third obstacle 53, the controller 15 detects the bottom side (the bottom surface) Mb of the takeout target object OM when the bottom side (the bottom surface) Mb of the takeout target object OM raised by the holder 13 is moved above the height of the top surface Ma of the third obstacle 53.

On the other hand, when the third obstacle 53 is not present in the front region 41a (that is, no obstacle is present) (step S15: NO), the controller 15 sets the object bottom detection position to the bottom side (the bottom surface) Mb of the recognizable takeout target object OM (step S17). By setting the object bottom detection position to the bottom side (the bottom surface) Mb of the takeout target object OM, the controller 15 detects the bottom side (the bottom surface) Mb of the takeout target object OM when the takeout target object OM is raised by the holder 13.

Subsequently, the controller 15 controls the arm 12 such that the takeout target object OM held by the holder 13 is raised (step S18). The controller 15 monitors a change in the 3-dimensional measurement data acquired by the second detector 14B on a realtime basis while the operation of raising the takeout target object OM is being performed. The controller 15 determines whether the bottom side (the bottom surface) Mb of the takeout target object OM is detected (that is, there is a change in the 3-dimensional measurement data) at predetermined sampling intervals (step S19).

When the bottom side (the bottom surface) Mb of the takeout target object OM is not detected (step S19: NO), the controller 15 continues the operation of raising the takeout target object OM. On the other hand, when the bottom side (the bottom surface) Mb of the takeout target object OM is detected (step S19: YES), the controller 15 ends the operation of raising the takeout target object OM. The controller 15 controls the arm 12 such that the takeout target object OM is pulled out of the first mounting region S1. That is, the controller 15 takes the takeout target object OM out of the first mounting region S1 by moving the takeout target object OM in the −X direction.

Next, an avoiding operation of avoiding the obstacles 51 and 52 will be described.

Figure 8:
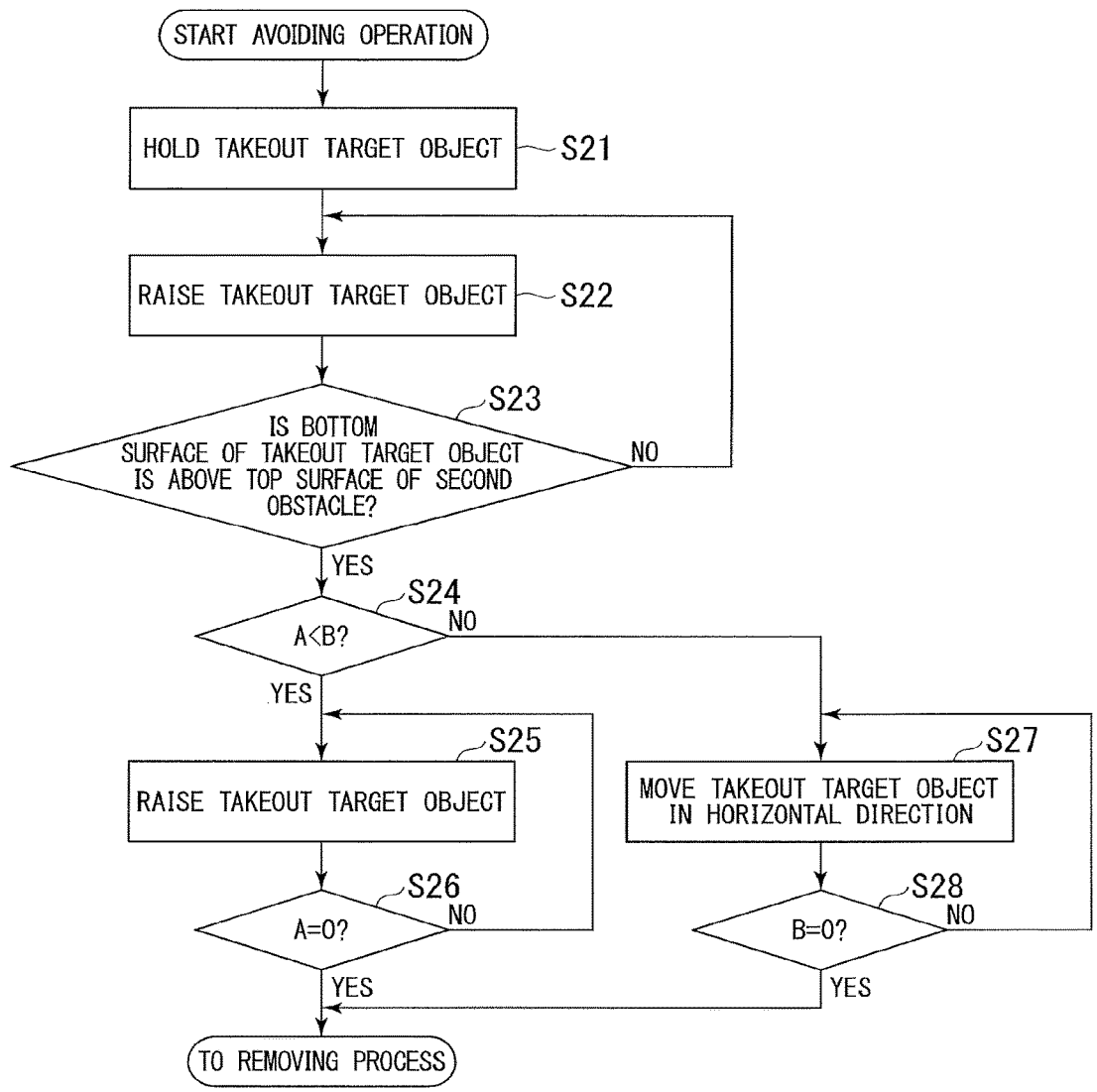
FIG. 8 is a flowchart showing an example of a flow of an avoiding operation according to the first embodiment.

FIG. 8 is a flowchart showing an example of a flow of an avoiding operation.

As shown in FIG. 8, first, the controller 15 controls the arm 12 and the holder 13 such that the takeout target object OM is held (step S21). In this case, the controller 15 sets the object bottom detection position to the height of the top surface Ma of the second obstacle 52, for example. By setting the object bottom detection position to the height of the top surface Ma of the second obstacle 52, when the bottom side (the bottom surface) Mb of the takeout target object OM raised by the holder 13 is moved above the height of the top surface Ma of the second obstacle 52, the controller 15 can detect the fact that the bottom side (the bottom surface) Mb of the takeout target object OM is above the height of the top surface Ma of the second obstacle 52.

Subsequently, the controller 15 controls the arm 12 such that the takeout target object OM held by the holder 13 is raised (step S22). The controller 15 monitors a change in the 3-dimensional measurement data acquired by the second detector 14B on a realtime basis while the operation of raising the takeout target object OM is being performed. The controller 15 determines whether the bottom side (the bottom surface) Mb of the takeout target object OM is moved above the height of the top surface Ma of the second obstacle 52 at predetermined sampling intervals on the basis of the detection result of the second detector 14B (step S23).

When it is not detected that the bottom side (the bottom surface) Mb of the takeout target object OM has moved above the height of the top surface Ma of the second obstacle 52 (step S23: NO), the controller 15 continues the operation of raising the takeout target object OM. On the other hand, when it is detected that the bottom side (the bottom surface) Mb of the takeout target object OM has moved above the height of the top surface Ma of the second obstacle 52 (step S23: YES), the controller 15 performs the following determination operation of determining the subsequent moving direction of the holder 13.

Figure 9:
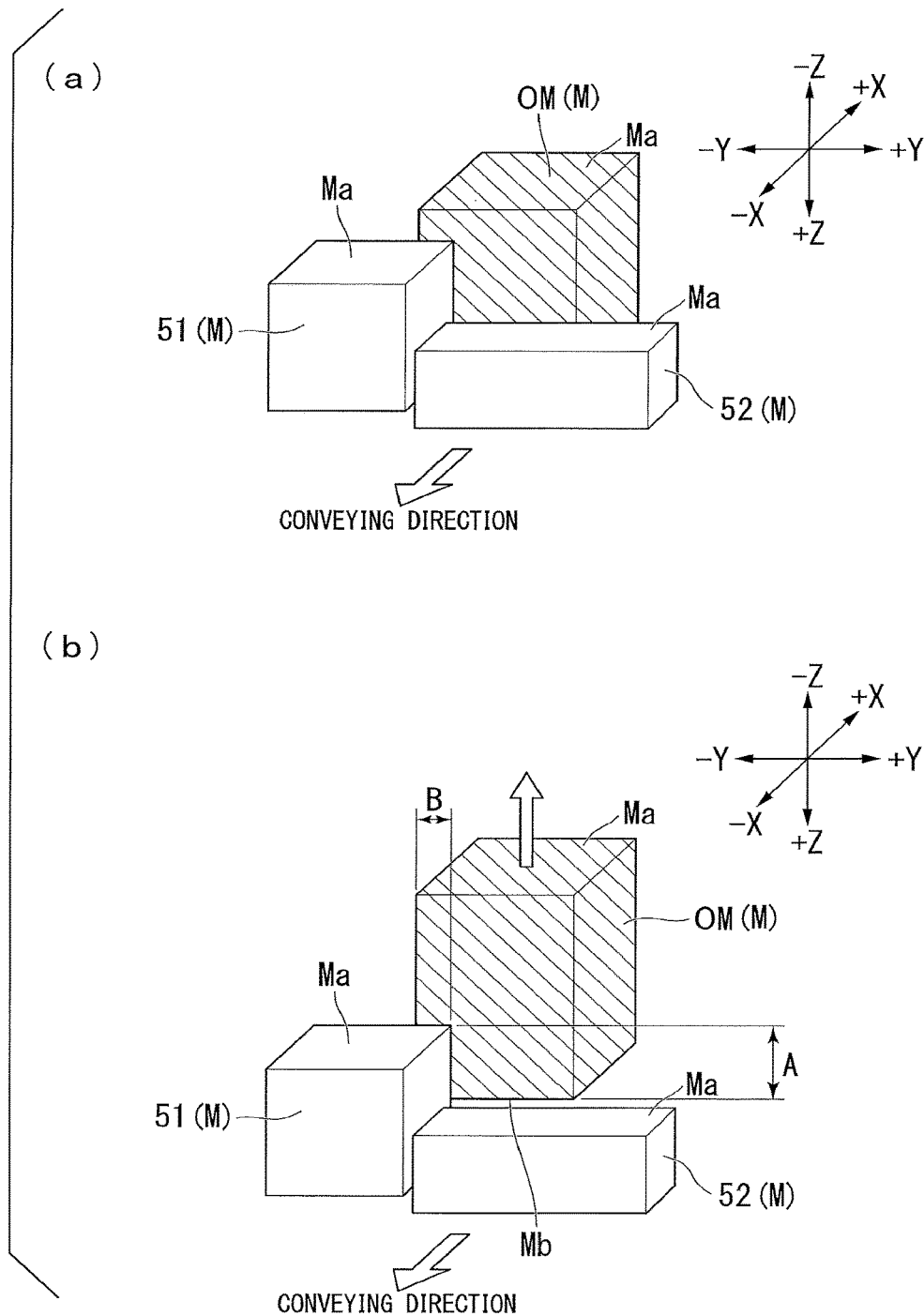
FIG. 9 is a perspective view schematically showing an avoiding operation according to the first embodiment.

FIG. 9 is a perspective view schematically showing an avoiding operation. (a) in FIG. 9 shows a state before the takeout target object OM is raised. (h) in FIG. 9 shows a state in which the bottom side (the bottom surface) Mb of the takeout target object OM has moved above the height of the top surface Ma of the second obstacle 52.

As shown in (b) in FIG. 9, the calculator 15c of the controller 15 calculates (detects) an estimated raising amount A for raising the takeout target object OM to avoid the first obstacle 51 and an estimated horizontal movement amount B for moving the takeout target object OM in an substantially horizontal direction away from the first obstacle 51 to avoid the first obstacle 51 on the basis of the detection result of the detector 14 in a state in which the bottom side (the bottom surface) Mb of the takeout target object OM is raised up to a height exceeding the top surface Ma of the second obstacle 52. The estimated raising amount A is a vertical interference amount between the takeout target object OM and the first obstacle 51 when seen in the +X direction. In other words, the estimated raising amount A is an example of an overlapping width (an overlapping amount, a covering amount) in the first direction (for example, the −Z direction) between the takeout target object OM and the first obstacle 51 on a projection plane viewed in a direction substantially parallel to the conveying direction of the takeout target object OM. The "projection plane viewed in a direction substantially parallel to the conveying direction" means a "projection plane substantially perpendicular to the conveying direction". On the other hand, the estimated horizontal movement amount B is a horizontal interference amount between the takeout target object OM and the first obstacle 51 when seen in the +X direction. For example, the estimated horizontal movement amount B is a movement amount for moving the takeout target object OM in an substantially horizontal direction substantially orthogonal to the conveying direction of the takeout target object OM to avoid the first obstacle 51. In other words, the estimated horizontal movement amount B is an example of an overlapping width (an overlapping amount, a covering amount) in the second direction (for example, the +Y or −Y direction) between the takeout target object OM and the first obstacle 51 on the projection plane. The calculator 15c of the present embodiment calculates the estimated raising amount A and the estimated horizontal movement amount B by performing an arithmetic operation on the basis of the information on the first object and the information on the second object obtained by the detector 14, for example. However, a method of detecting the estimated raising amount A and the estimated horizontal movement amount B by the controller 15 is not limited to the above-mentioned example. For example, the controller 15 may recognize the estimated raising amount A and the estimated horizontal movement amount B on the basis of the measurement result of the estimated raising amount A and the estimated horizontal movement amount B. Therefore, the calculator 15c may be referred to as a "detector", a "recognizer", or the like. As shown in FIG. 8, the moving direction determiner 15d of the controller 15 compares the estimated raising amount A and the estimated horizontal movement amount B to determine which one of the movement amounts is smaller (step S24). The moving direction determiner 15d of the controller 15 determines that the holder 13 is to be moved in the −Z direction when the estimated raising amount A is smaller than the estimated horizontal movement amount B. On the other hand, the moving direction determiner 15d of the controller 15 determines that the holder 13 is to be moved in the +Y direction (or the −Y direction) when the estimated horizontal movement amount B is smaller than the estimated raising amount A.

More specifically, when the estimated horizontal movement amount B is larger than the estimated raising amount A (step S24: YES), the controller 15 continues the operation of raising the takeout target object OM held by the holder 13 by controlling the arm 12 (step S25). In this case, the controller 15 monitors a change in the estimated raising amount A necessary for avoiding the first obstacle 51 by detecting the position of the bottom side (the bottom surface) Mb of the takeout target object OM using the detector 14, for example, while continuously performing the operation of raising the takeout target object OM. That is, the controller 15 determines whether the estimated raising amount A for avoiding the first obstacle 51 has reached zero at the predetermined sampling intervals (step S26). When the estimated raising amount A has not reached zero (step S26: NO), the controller 15 continues the operation of raising the takeout target object OM. On the other hand, when the estimated raising amount A has reached zero (step S26: YES), the controller 15 ends the operation of raising the takeout target object OM. In this way, the avoiding operation for the first obstacle 51 ends. After that, the controller 15 controls the arm 12 such that the takeout target object OM is pulled out of the first mounting region S1. That is, the controller 15 moves the takeout target object OM in the −X direction to pull the takeout target object OM out of the first mounting region S1.

On the other hand, when the estimated raising amount A is larger than the estimated horizontal movement amount B (step S24: NO), the controller 15 controls the arm 12 such that the operation of raising the takeout target object OM held by the holder 13 is stopped and moves the takeout target object OM in an substantially horizontal direction away from the first obstacle 51 (step S27). For example, the controller 15 moves the takeout target object OM in an substantially horizontal direction substantially orthogonal to the conveying direction of the takeout target object OM. In this case, the controller 15 monitors a change in the estimated horizontal movement amount B necessary for avoiding the first obstacle 51 by detecting the position of the lateral side (the side surface) of the takeout target object OM using the detector 14, for example, while moving the takeout target object OM in an substantially horizontal direction. That is, the controller 15 determines whether the estimated horizontal movement amount B for avoiding the first obstacle 51 has reached zero at the predetermined sampling intervals (step S28). When the estimated horizontal movement amount B has not reached zero (step S28: NO), the controller 15 continues moving the takeout target object OM in an substantially horizontal direction. On the other hand, when the estimated horizontal movement amount B has reached zero (step S28: YES), the controller 15 stops moving the takeout target object OM in an substantially horizontal direction. In this way, the avoiding operation for the first obstacle 51 ends. After that, the controller 15 controls the arm 12 such that the takeout target object OM is pulled out of the first mounting region S1. That is, the controller 15 pulls the takeout target object OM out of the first mounting region S1 by moving the takeout target object OM in the −X direction.

Figure 10:
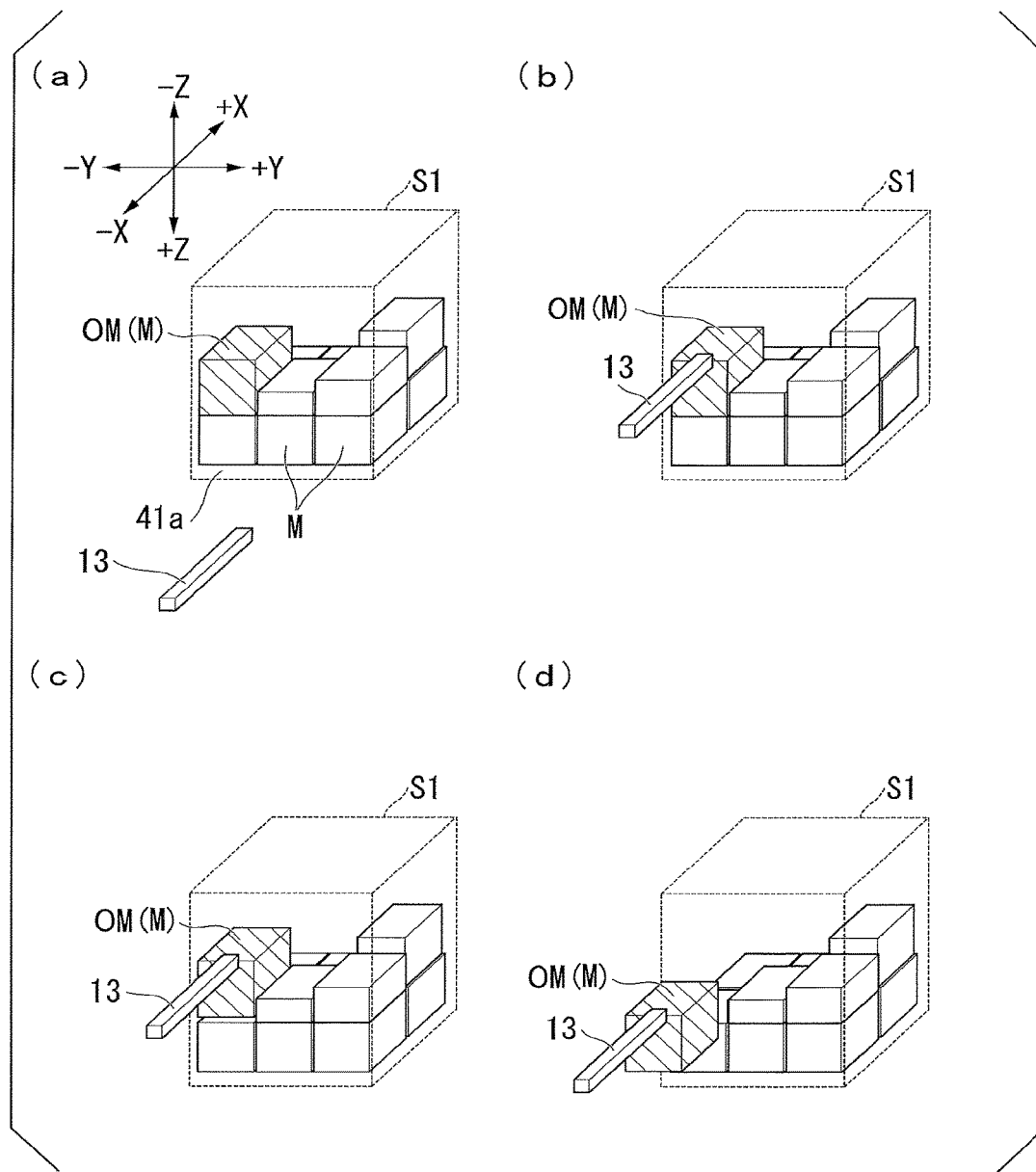
FIG. 10 is a perspective view schematically showing a first operation example of the conveying device according to the first embodiment.
Figure 11:
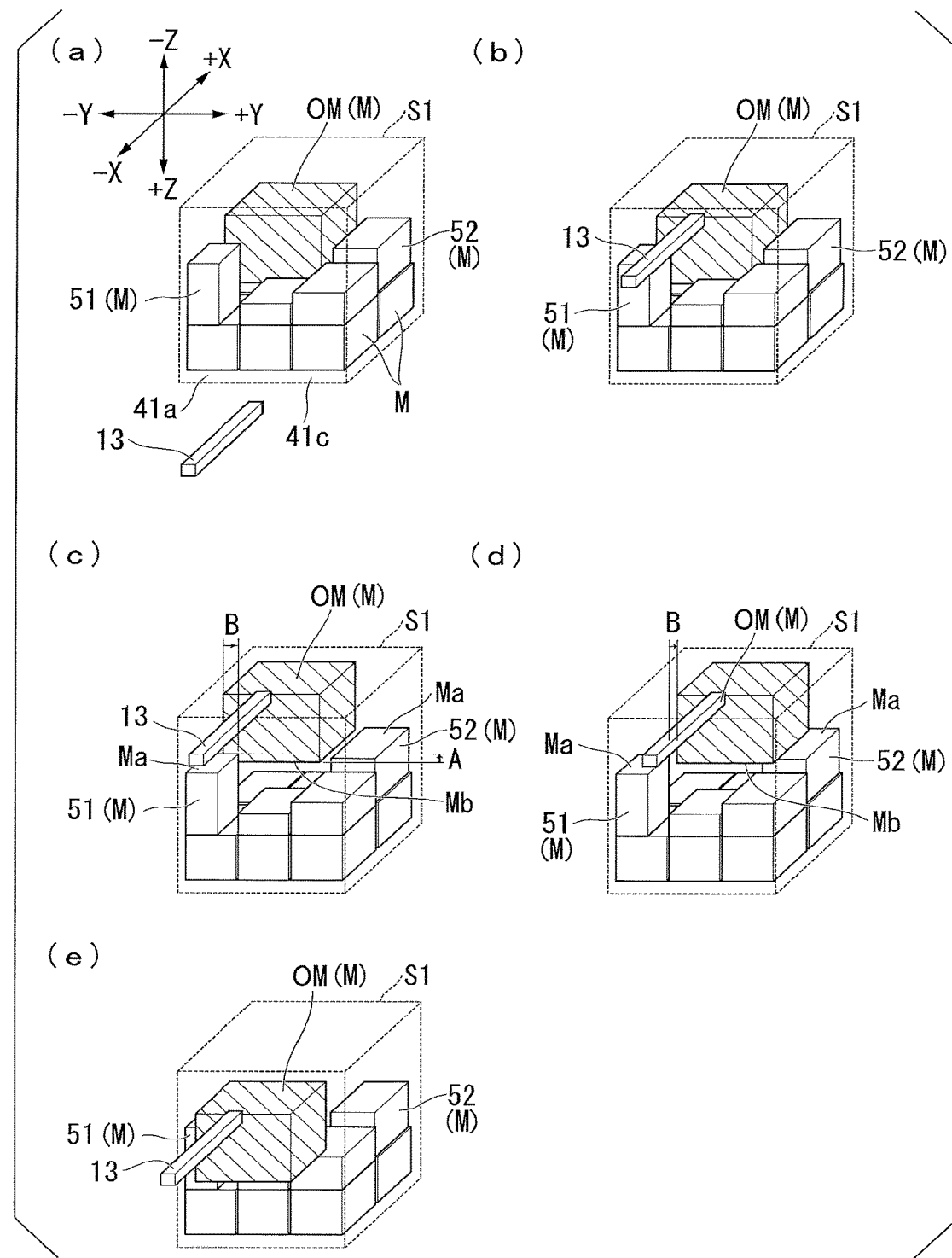
FIG. 11 is a perspective view schematically showing a second operation example of the conveying device according to the first embodiment.
Figure 12:
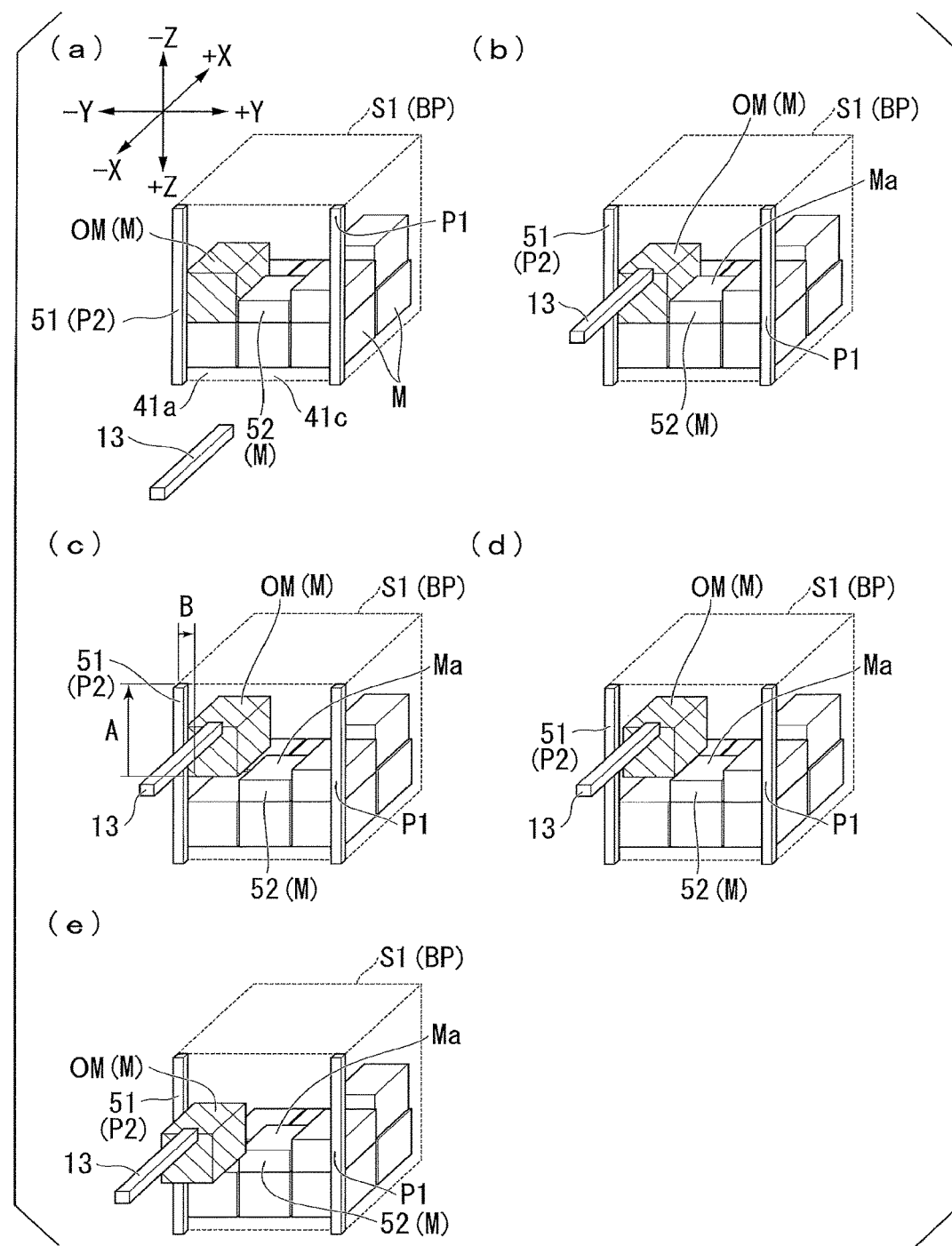
FIG. 12 is a perspective view schematically showing a third operation example of the conveying device according to the first embodiment.

FIGS. 10 to 12 show a specific operation example of the conveying device 1 of the present embodiment.

FIG. 10 shows an example in which an obstacle is not present in the front region 41a with respect to the takeout target object OM and an avoiding operation is not performed. In this example, the takeout target object OM is positioned on the front row of the first mounting region S1, for example (see (a) in FIG. 10). The holder 13 holds the takeout target object OM (see (b) in FIG. 10) and slightly raises the takeout target object OM (see (c) in FIG. 10). The holder 13 pulls the takeout target object OM out in the −X direction (see (d) in FIG. 10). In this way, the takeout target object OM is pulled out of the first mounting region S1.

FIG. 11 shows an example in which an obstacle is present in the front region 41a of the takeout target object OM and an avoiding operation is performed. In this example, the first obstacle 51 is present in the front region 41a with respect to the takeout target object OM, and the second obstacle 52 is present in the right region 41c with respect to the takeout target object OM (see (a) in FIG. 11). The holder 13 holds the takeout target object OM (see (b) in FIG. 11) and raises the takeout target object OM up to a position at which the bottom side (or the bottom surface) Mb of the takeout target object OM is above the top surface Ma of the second obstacle 52 (see (c) in FIG. 11). The controller 15 compares the estimated raising amount A and the estimated horizontal movement amount B at a time point at which the bottom side (or the bottom surface) Mb of the takeout target object OM is above the top surface Ma of the second obstacle 52. In this example, since the estimated horizontal movement amount B is smaller than the estimated raising amount A, the controller 15 controls the arm 12 such that the takeout target object OM is moved in an substantially horizontal direction (see (d) in FIG. 11). In this way, the takeout target object OM avoids the first obstacle 51. The holder 13 pulls the takeout target object OM out in the −X direction (see (e) in FIG. 11). In this way, the takeout target object OM is pulled out of the first mounting region S1.

FIG. 12 shows a case in which the first mounting region S1 is formed by the box palette BP and the pole P2 is present as an obstacle. In this example, the pole P2 as the first obstacle 51 is present in the front region 41a with respect to the takeout target object OM and the second obstacle 52 is present in the right region 41c with respect to the takeout target object OM (see (a) in FIG. 12). The holder 13 holds the takeout target object OM (see (b) in FIG. 12) and raises the takeout target object OM up to a position at which the bottom side (or the bottom surface) Mb of the takeout target object OM is above the top surface Ma of the second obstacle 52 (see (c) in FIG. 12). The controller 15 compares the estimated raising amount A and the estimated horizontal movement amount B at a time point at which the bottom side (or the bottom surface) Mb of the takeout target object OM is above the top surface Ma of the second obstacle 52. In this example, since the estimated horizontal movement amount B is smaller than the estimated raising amount A, the controller 15 controls the arm 12 such that the takeout target object OM is moved in an substantially horizontal direction (see (d) in FIG. 12). In this way, the takeout target object OM avoids the pole P2 as the first obstacle 51. The holder 13 pulls the takeout target object OM out in the −X direction (see (e) in FIG. 12). In this way, the takeout target object OM is taken out of the first mounting region S1 without making contact with the pole P2.

According to such a configuration, it is possible to accelerate takeout of the object M.

Here, as a comparative example, a conveying device in which for a conveying operation in a plant or a warehouse, the size of an object is registered in advance and the stacking state and the arrangement of objects are determined in advance will be considered. In such a conveying device, it is difficult to recognize objects when the stacking state is random or non-uniform objects are also stacked. Due to this, the operation of taking out objects may be stopped even when the holder for holding an object can hold the object.

On the other hand, in the present embodiment, the conveying device 1 includes the detector 14 (an information acquirer) and the controller 15. The detector 14 acquires information on at least the first object (for example, the takeout target object OM) and the second object (for example, the object M serving as the first obstacle 51). When the second object is positioned in the conveying direction of the first object with respect to the first object, the controller 15 determines the moving direction of the holder 13 holding the first object, based on the information acquired by the detector 14, on the basis of the overlapping width (for example, the estimated raising amount A) in the first direction between the first object and the second object on the projection plane viewed in the direction substantially parallel to the conveying direction and the overlapping width (for example, the estimated horizontal movement amount B) in the second direction crossing the first direction between the first object and the second object on the projection plane. For example, the controller 15 moves the holder 13 in the first direction when the overlapping width in the first direction is smaller than the overlapping width in the second direction and moves the holder 13 in the second direction when the overlapping width in the second direction is smaller than the overlapping width in the first direction. A method of determining the moving direction of the holder 13 with the controller 15 is not limited to the above-mentioned example. For example, the controller 15 may determine a third direction different from the first and second directions as the moving direction of the holder 13 on the basis of the overlapping width in the first direction and the overlapping width in the second direction. Moreover, the controller 15 may move the holder 13 in the horizontal direction when the estimated horizontal movement amount B is smaller than a predetermined threshold (or when a difference between the estimated raising amount A and the estimated horizontal movement amount B is smaller than a predetermined threshold) even when the estimated horizontal movement amount B is larger than the estimated raising amount A, for example. Moreover, from another perspective, the controller 15 may move the holder 13 in the horizontal direction without comparing the estimated raising amount A and the estimated horizontal movement amount B when the estimated horizontal movement amount B is smaller than a predetermined threshold.

In the present embodiment, for example, the detector 14 detects the first object (for example, the takeout target object OM) and the second object (for example, an object M serving as the first obstacle 51). When it is determined that the second object is positioned in the conveying direction (for example, the −X direction) of the first object in relation to the first object on the basis of the detection result of the detector 14, the controller 15 calculates a first movement amount (for example, the estimated raising amount A) for moving the first object in the first direction (for example, the −Z direction) to avoid the second object and a second movement amount (for example, the estimated horizontal movement amount B) for moving the first object in the second direction (for example, the +Y direction or −Y direction) crossing the first direction to avoid the second object. The controller 15 determines the moving direction of the holder 13 holding the first object on the basis of comparison between the first movement amount and the second movement amount.

According to such a configuration, it is possible to perform an operation of sequentially taking out a plurality of objects M stacked randomly in a safe, reliable, and efficient manner. Moreover, according to the configuration, it is possible to reduce the movement amount of the object M necessary for taking out the object M when objects M of many types are stacked in a complex state. In this way, it is possible to accelerate takeout of the objects M. Moreover, according to the configuration, since it is possible to reduce the raising amount of the object M, it is possible to further improve the safety in taking out the object M. The controller 15 may not calculate the estimated raising amount A and the estimated horizontal movement amount B. In this case, the information acquirer (for example, the information acquirer 110 to be described later) of the conveying device 1 may acquire the estimated raising amount A and the estimated horizontal movement amount B calculated (detected, measured) by an external device from the external device, a database, or the like. Moreover, the controller 15 may determine the moving direction of the holder 13 on the basis of the estimated raising amount A and the estimated horizontal movement amount B acquired by the information acquirer.

In the present embodiment, the detector 14 detects a plurality of objects M including the first and second objects. The first object is an object having the top surface Ma at the highest position among the plurality of objects M. The second object is an object having the top surface Ma at the highest position among objects positioned in the conveying direction (for example, the −X direction) of the first object in relation to the first object among the plurality of objects M. According to such a configuration, the first object can be taken out of the mounting region S1 by avoiding the second object. Therefore, by determining the moving direction of the first object in which the second object is avoided efficiently, it is possible to take the first object out of the mounting region S1 efficiently. In this way, it is possible to further accelerate takeout of the object M.

In the present embodiment, the plurality of objects M detected by the detector 14 includes a third object (an object serving as the second obstacle 52) having the top surface Ma at a position that is lower than the top surface Ma of the second object and is higher than the bottom surface Mb of the first object. The controller 15 calculates the first movement amount and the second movement amount, for example, in a state in which the bottom surface Mb of the first object is raised up to a height above the top surface Ma of the third object and determines the moving direction of the holder 13 holding the first object on the basis of the first movement amount and the second movement amount (for example, on the basis of comparison between the first movement amount and the second movement amount). Here, in a state in which the bottom surface Mb of the first object is raised up to a height above the top surface Ma of the third object, the first object will not come into contact with the third object even when the first object is moved substantially in a horizontal direction. According to such a configuration, it is possible to determine the moving direction of the first object for avoiding two obstacles (the second and third objects) efficiently. In this way, it is possible to accelerate takeout of the object M. Moreover, according to such a configuration, it is possible to simplify calculation and determination of the avoiding operation of allowing the first object to avoid two obstacles. In this way, the controller 15 of which the processing speed is not fast, for example, can shorten the processing time required for calculation. In this respect, it is possible to accelerate takeout of the object M.

In the present embodiment, the plurality of objects M includes a plurality of surrounding objects CM arranged in at least one of the front region 41a positioned in the conveying direction in relation to the first object and the lateral regions (the left region 41b and the right region 41c) positioned on both sides of the first object and on both sides of the front region 41a in the direction crossing the conveying direction. The third object is an object M having the top surface Ma at the next highest position after the second object among the plurality of surrounding objects CM. According to such a configuration, by raising the bottom surface Mb of the first object up to a height above the top surface Ma of the third object, the first object does not come into contact with any surrounding objects CM even when the first object is moved substantially in a horizontal direction. Due to this, it is possible to further simplify calculation and determination of the avoiding operation. In this way, it is possible to further accelerate takeout of the object M.

In the present embodiment, the detector 14 detects an obstacle (for example, the pole P1 of the box palette BP) including a portion located above the top surface Ma of the second object. When the obstacle is detected by the detector 14 (when information related to the obstacle is acquired by the information acquirer), the controller 15 calculates a third movement amount for moving the first object in the first direction to avoid the obstacle (for example, the estimated raising amount A for avoiding the pole P1 or an overlapping width in the first direction between the takeout target object and the obstacle on the projection plane) and a fourth movement amount for moving the first object in the second direction to avoid the obstacle (for example, the estimated horizontal movement amount B for avoiding the pole P1 or an overlapping width in the second direction between the takeout target object and the obstacle on the projection plane) and determines the moving direction of the holder 13 holding the first object on the basis of the third movement amount and the fourth movement amount (for example, on the basis of comparison between the third movement amount and the fourth movement amount) instead of the first movement amount and the second movement amount. According to such a configuration, even when an obstacle different from the object M is present, it is possible to avoid the obstacle efficiently using the same algorithm and to accelerate takeout of the object M. The controller 15 may not calculate the estimated raising amount A and the estimated horizontal movement amount B for avoiding the obstacle. For example, an information acquirer (for example, the information acquirer 110 to be described later) of the conveying device 1 may obtain the estimated raising amount A and the estimated horizontal movement amount B for avoiding the obstacle, calculated (detected, measured) by an external device from the external device, a database, or the like. The controller 15 may determine the moving direction of the holder 13 on the basis of the estimated raising amount A and the estimated horizontal movement amount B acquired by the information acquirer.

The conveying system 100 of the present embodiment includes a determiner (for example, the moving direction determiner 15d). When it is determined that the second object is positioned in the conveying direction of the first object in relation to the first object on the basis of the information on the first object and the second object, the determiner determines the moving direction of the holder 13 holding the first object on the basis of the overlapping width in the first direction between the first object and the second object on the projection plane viewed in the direction substantially parallel to the conveying direction and the overlapping width in the second direction crossing the first direction between the first object and the second object on the projection plane. In this way, it is possible to accelerate takeout of the object M and improve safety. The conveying system 100 may include other functions (for example, the selector 15a, the obstacle detector 15b, and the calculator 15c) related to the detector 14 and the controller 15.

The conveying method of the present embodiment includes determining the moving direction of the holder 13 holding the first object on the basis of the overlapping width in the first direction between the first object and the second object on the projection plane viewed in the direction substantially parallel to the conveying direction and the overlapping width in the second direction crossing the first direction between the first object and the second object on the projection plane when it is determined that the second object is positioned in the conveying direction of the first object in relation to the first object on the basis of the information on the first and second objects. In this way, it is possible to accelerate takeout of the object M and improve safety.

Next, some modifications of the first embodiment will be described. Constituent elements other than those described below are the same as the constituent elements of the first embodiment.

(First Modification)

Figure 13:
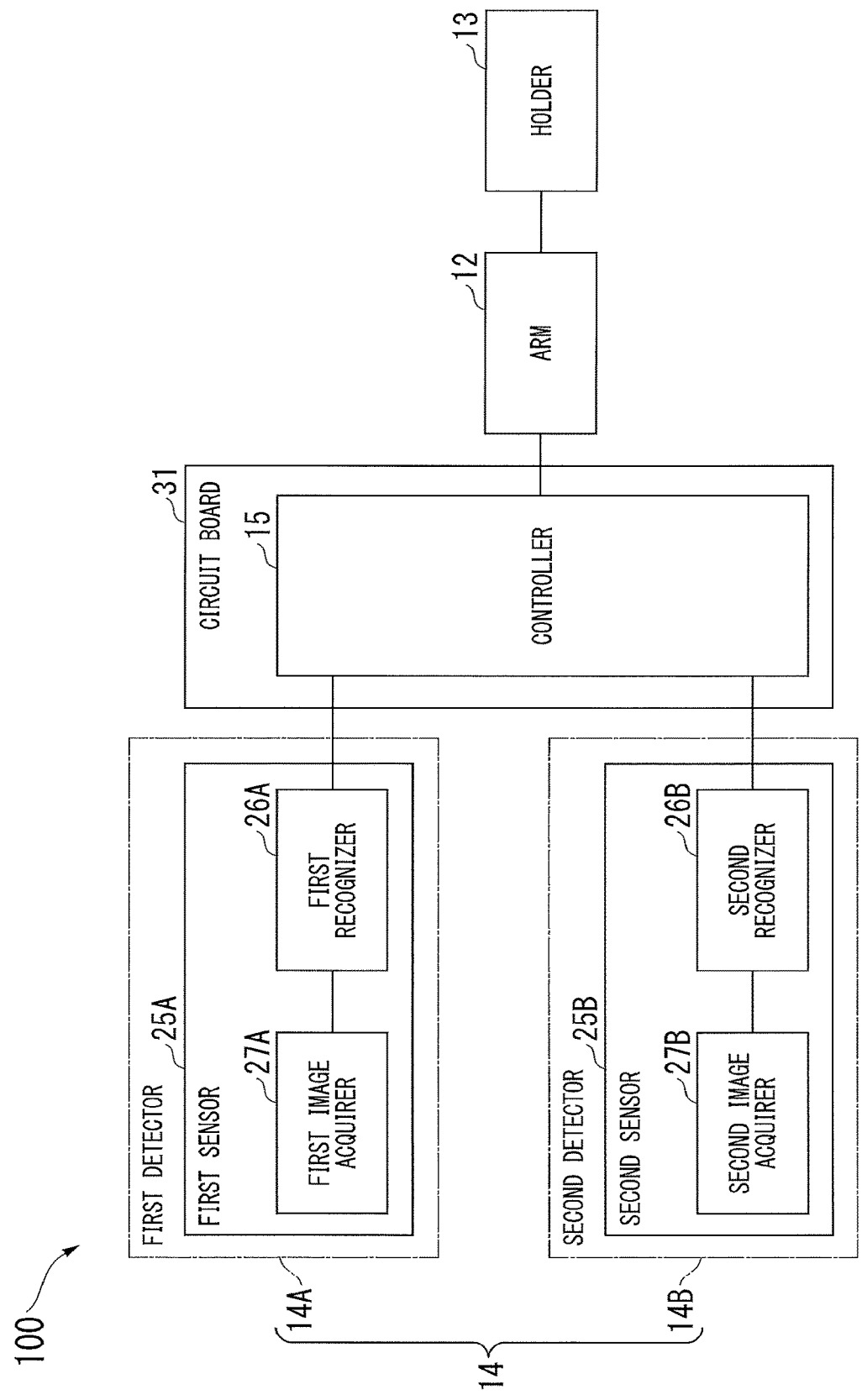
FIG. 13 is a block diagram showing a modification of a system configuration of the conveying device according to the first embodiment.

FIG. 13 is a block diagram showing a system configuration of the conveying device 1 according to the first modification.

As shown in FIG. 13, in this modification, the first recognizer 26A of the first detector 14A is provided inside the first sensor (for example, a camera) 25A. Similarly, the second recognizer 26B of the second detector 14B is provided inside the second sensor (for example, a camera) 25B. With such a configuration, it is possible to realize the first and second detectors 14A and 14B similarly to those of the first embodiment.

(Second Modification)

Figure 14:
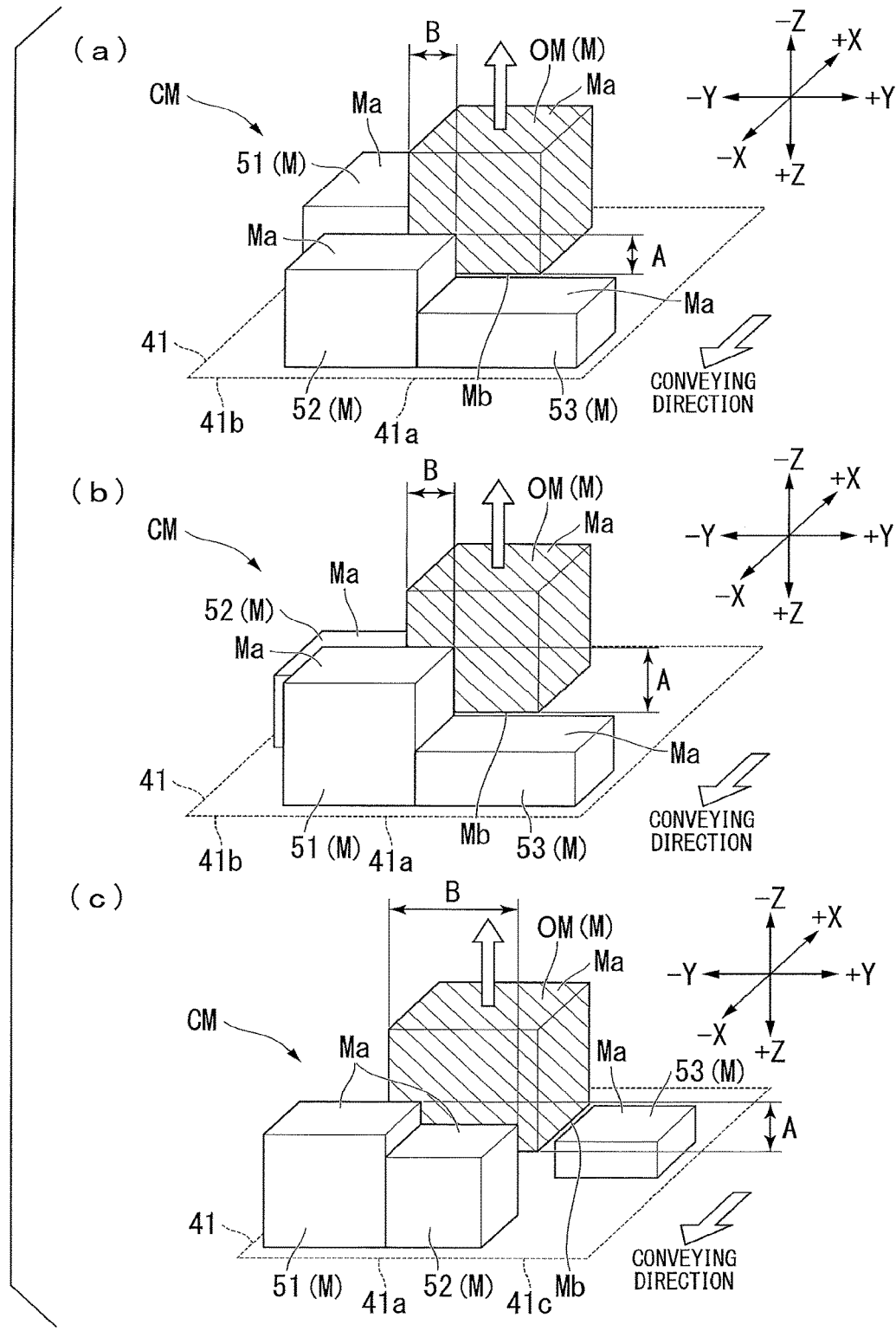
FIG. 14 is a perspective view showing a modification of the conveying method according to the first embodiment.

FIG. 14 schematically shows a conveying method of the conveying device 1 according to a second modification.

As shown in FIG. 14, in this modification, the surrounding objects CM include a first obstacle 51, a second obstacle 52, and a third obstacle 53. The first obstacle 51 is an object M having the top surface Ma at the highest position among the surrounding objects CM. When an obstacle such as the pole P1 is present, the first obstacle 51 may be set to the pole P1. The second obstacle 52 is an object M having the top surface Ma at the next highest position after the first obstacle 51 among the surrounding objects CM. The third obstacle 53 is an object M having the top surface Ma at the next highest position after the second obstacle 52 among the surrounding objects CM.

In the example shown in (a) in FIG. 14, the first obstacle 51 is positioned in the left region 41b and the second and third obstacles 52 and 53 are positioned in the front region 41a. In the example shown in (b) in FIG. 14, the first and third obstacles 51 and 53 are positioned in the front region 41a and the second obstacle 52 is positioned in the left region 41b. In the example shown in (c) in FIG. 14, the first and second obstacles 51 and 52 are positioned in the front region 41a and the third obstacle 53 is positioned in the right region 41c.

In the first embodiment, the controller 15 calculates the estimated raising amount A and the estimated horizontal movement amount B necessary for avoiding the first obstacle 51 in a state in which the bottom side (the bottom surface) Mb of the takeout target object OM is raised up to a height above the top surface Ma of the second obstacle 52.

On the other hand, in this modification, the controller 15 calculates a first movement amount (for example, an estimated raising amount A) for moving the takeout target object OM in the first direction (for example, the −Z direction) to avoid the first and second obstacles 51 and 52 and a second movement amount (an the estimated horizontal movement amount B) for moving the takeout target object OM in the second direction (for example, the +Y or −Y direction) crossing the first direction to avoid the first and second obstacles 51 and 52 in a state in which the bottom side (the bottom surface) Mb of the takeout target object OM is raised up to a height above the top surface Ma of the third obstacle 53 (that is, a state in which the bottom side (the bottom surface) Mb of the takeout target object OM is lower than the top surface Ma of the second obstacle 52). The controller 15 determines the moving direction of the holder 13 holding the takeout target object OM on the basis of comparison between the first movement amount and the second movement amount.

When the estimated raising amount A is smaller than the estimated horizontal movement amount B and the operation of raising the first object is continued, the controller 15 may perform the determination process again in a state in which the base (the bottom surface) Mb of the takeout target object OM is raised up to a height above the top surface Ma of the second obstacle 52.

According to such a configuration, the subsequent moving direction of the holder 13 is determined in a stage in which the base (the bottom surface) Mb of the takeout target object OM is raised up to a height above the top surface Ma of the third obstacle 53. Due to this, there is a case in which it is possible to move the takeout target object OM substantially in a horizontal direction at an earlier timing than the first embodiment and to avoid the obstacle. In this way, it is possible to further accelerate the takeout of the object M.

Based on thinking similar to the above, by focusing on obstacles (a fourth obstacle, a fifth obstacle, and the like) having the top surface Ma at a lower position than the top surface Ma of the third obstacle 53, the subsequent moving direction of the holder 13 may be determined at every stage in which the base (the bottom surface) Mb of the takeout target object OM is raised up to a height over the top surfaces Ma of these obstacles. With such a configuration, it may be possible to further accelerate the takeout of the object M.

Second Embodiment

Next, a second embodiment will be described with reference to FIGS. 15 to 17.

The present embodiment is different from the first embodiment in that an object M different from an object M having the top surface Ma at the highest position is taken out preferentially. Constituent elements other than those described below are the same as the constituent elements of the first embodiment.

The controller 15 of the present embodiment selects, as the takeout target object OM, an object M (hereinafter referred to as a second height object 62) having the top surface Ma at a lower position than the top surface Ma of an object M (hereinafter referred to as a first height object 61) having the top surface at the highest position rather than the first height object 61 when a predetermined condition is satisfied. For example, the second height object 62 has the top surface Ma at a position lower than the top surface Ma of the first height object 61 at a position (region) on the downstream side of the first height object 61 in the conveying direction of the first height object 61. For example, the second height object 62 is an object M having the top surface Ma at the highest position among the plurality of objects M positioned on the downstream side of the first height object 61 in the conveying direction of the first height object 61. Moreover, the second height object 62 has at least an exposed portion Me exposed to the outside (for example, the upper side) at a position (region) on the downstream side of the first height object 61 in the conveying direction of the first height object 61 (see FIG. 15). The expression "exposed to the outside" means a state in which the upper side is not covered by other objects M or the like.

For example, the second height object 62 is an object M (that is, an object M positioned in the front region 41a of the first height object 61) that the first height object 61 overlaps (faces) in the conveying direction of the first height object 61. The "second object (the second height object) positioned on the downstream side of the first object (the first height object) in the conveying direction of the first object (the first height object)" mentioned in the specification is not limited to an object that the first object overlaps (faces) in the conveying direction. The "second object (the second height object) positioned on the downstream side of the first object (the first height object) in the conveying direction of the first object (the first height object)" may be a second object that is positioned to be shifted in the +Y or −Y direction in relation to the first object and that the first object does not overlap (does not face) in the conveying direction. In the following description, the conveying direction of the first height object 61 is referred to simply as "the conveying direction".

Next, the predetermined condition under which the second height object 62 is selected as the takeout target object OM will be described.

Figure 15:
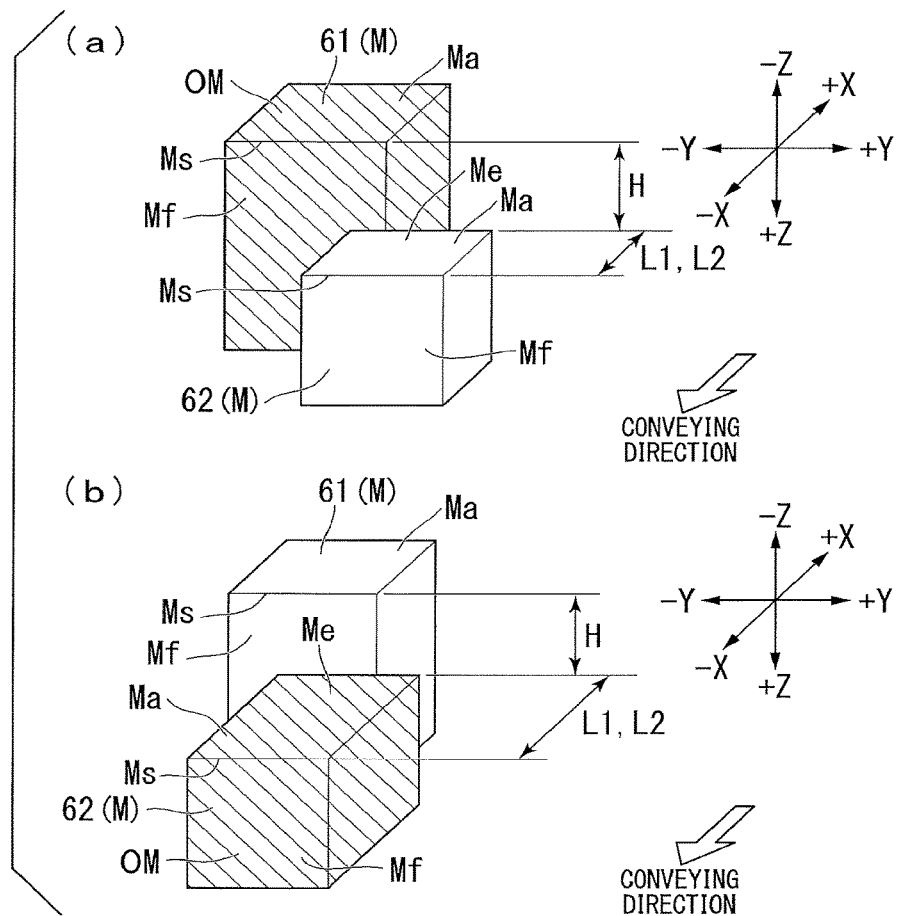
FIG. 15 is a perspective view schematically showing a takeout target object determining method according to a second embodiment.

FIG. 15 schematically shows a takeout target object determining method.

(a) in FIG. 15 shows an example of a case in which the predetermined condition is not satisfied. For example, the case in which the predetermined condition is not satisfied is a case in which the top surface Ma of the first height object 61 is obviously at a higher position than the top surface Ma of the second height object 62. That is, the case in which the predetermined condition is not satisfied is a case in which a height difference H between the top surface Ma of the first height object 61 and the top surface Ma of the second height object 62 is equal to or larger than a predetermined height (a predetermined value). For example, the predetermined height is set on the basis of an outer size of the object M registered in the conveying device 1 as a conveying target. For example, the predetermined height is set to substantially the same size as the length of the shortest side of the outer shape of the object M registered in the conveying device 1. For example, when a parallelepiped object M having a vertical width of 100 mm, a horizontal width of 200 mm, and a depthwise width of 150 mm is registered as a conveying target, the "shortest side of the outer shape of the object" mentioned in the specification is 100 mm which is the smallest among the vertical width, the horizontal width, and the depthwise width. When the predetermined condition is not satisfied, the controller 15 determines the first height object 61 as the takeout target object OM that is taken out earlier than the second height object 62. In this case, the second height object 62 is the first obstacle 51, for example.

On the other hand, (b) in FIG. 15 shows an example of a case where the predetermined condition is satisfied. For example, the case in which the predetermined condition is satisfied is a case in which the height difference H between the top surface Ma of the first height object 61 and the top surface Ma of the second height object 62 is smaller than the predetermined height and a length L1 in the conveying direction between a downstream side end (for example, the front edge Ms) of the second height object 62 in the conveying direction and a downstream side end (for example, the front edge Ms) of the first height object 61 is larger than a predetermined length (a predetermined value). For example, the predetermined length is set on the basis of the outer size of the object M registered in the conveying device 1 as a conveying target. For example, the predetermined length is set to substantially the same length as the length of the shortest side of the outer shape of the object M registered in the conveying device 1. When the predetermined condition is satisfied, the controller 15 determines the second height object 62 as the takeout target object OM which is taken out earlier than the first height object 61. In this case, the object M positioned in the check region 41 set with respect to the second height object 62 is the first obstacle 51 or the like.

The "length L1 in the conveying direction between the downstream side end of the second height object 62 and the downstream side end of the first height object 61 in the conveying direction" is the distance in the conveying direction between the end surface (the front surface) Mf of the second height object 62 facing the downstream side in the conveying direction and the end surface (the front surface) Mf of the first height object 61 facing the downstream side in the conveying direction, for example. The "distance in the conveying direction" means the distance along the −X direction.

In other respects, the controller 15 may determine that the predetermined condition is satisfied when the height difference H between the top surface Ma of the first height object 61 and the top surface Ma of the second height object 62 is smaller than the predetermined height and a length L2 of the exposed portion Me of the second height object 62 in the conveying direction is larger than a predetermined length (a predetermined value). That is, the expression "the distance L1 in the conveying direction between the downstream side end of the second height object 62 and the downstream side end of the first height object 61 in the conveying direction" in the following description may be read as "the length L2 of the exposed portion Me of the second height object 62 in the conveying direction". When the first height object 61 and the second height object 62 are adjacent to each other in the conveying direction, "the length L2 of the exposed portion Me of the second height object 62 in the conveying direction" is substantially identical to the distance L1. For example, the controller 15 recognizes the length L2 of the exposed portion Me of the second height object 62 in the conveying direction on the basis of the detection result of the detector 14.

The predetermined condition for selecting the second height object 62 as the takeout target object OM is not limited to the above-described example. For example, the controller 15 may select the takeout target object OM on the basis of any one of the conditions of the height difference H between the top surface Ma of the first height object 61 and the top surface Ma of the second height object 62 and the distance L1 in the conveying direction between the downstream side end (for example, the front edge Ms) of the second height object 62 and the downstream side end (for example, the front edge Ms) of the first height object 61 in the conveying direction. That is, the controller 15 may select the second height object 62 as the takeout target object OM when the height difference H between the top surface Ma of the first height object 61 and the top surface Ma of the second height object 62 is smaller than the predetermined height or the distance L1 between the downstream side end (the front edge Ms) of the second height object 62 and the downstream side end (the front edge Ms) of the first height object 61 in the conveying direction is larger than the predetermined length.

Next, a case in which a plurality of second height objects 62 is present on the downstream side of the first height object 61 in the conveying direction will be described. The plurality of second height objects 62 have the top surfaces Ma at substantially the same height, for example.

Figure 16:
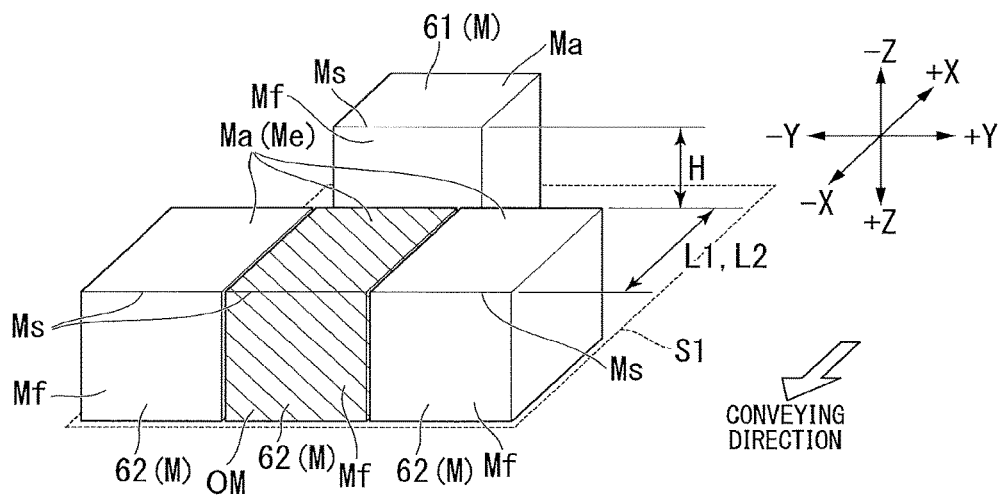
FIG. 16 is a perspective view schematically showing a takeout target object determining method according to the second embodiment.

FIG. 16 schematically shows the first height object 61 and the plurality of second height objects 62.

When a plurality of second height objects 62 is detected by the detector 14, the controller 15 of the present embodiment determines the second height object 62 located closest to the center (for example, the center in the direction crossing the conveying direction of the first height object 61) of the first mounting region S1 among the plurality of second height objects 62 as the takeout target object OM. The direction crossing the conveying direction of the first height object 61 is the +Y direction, for example.

Figure 17:
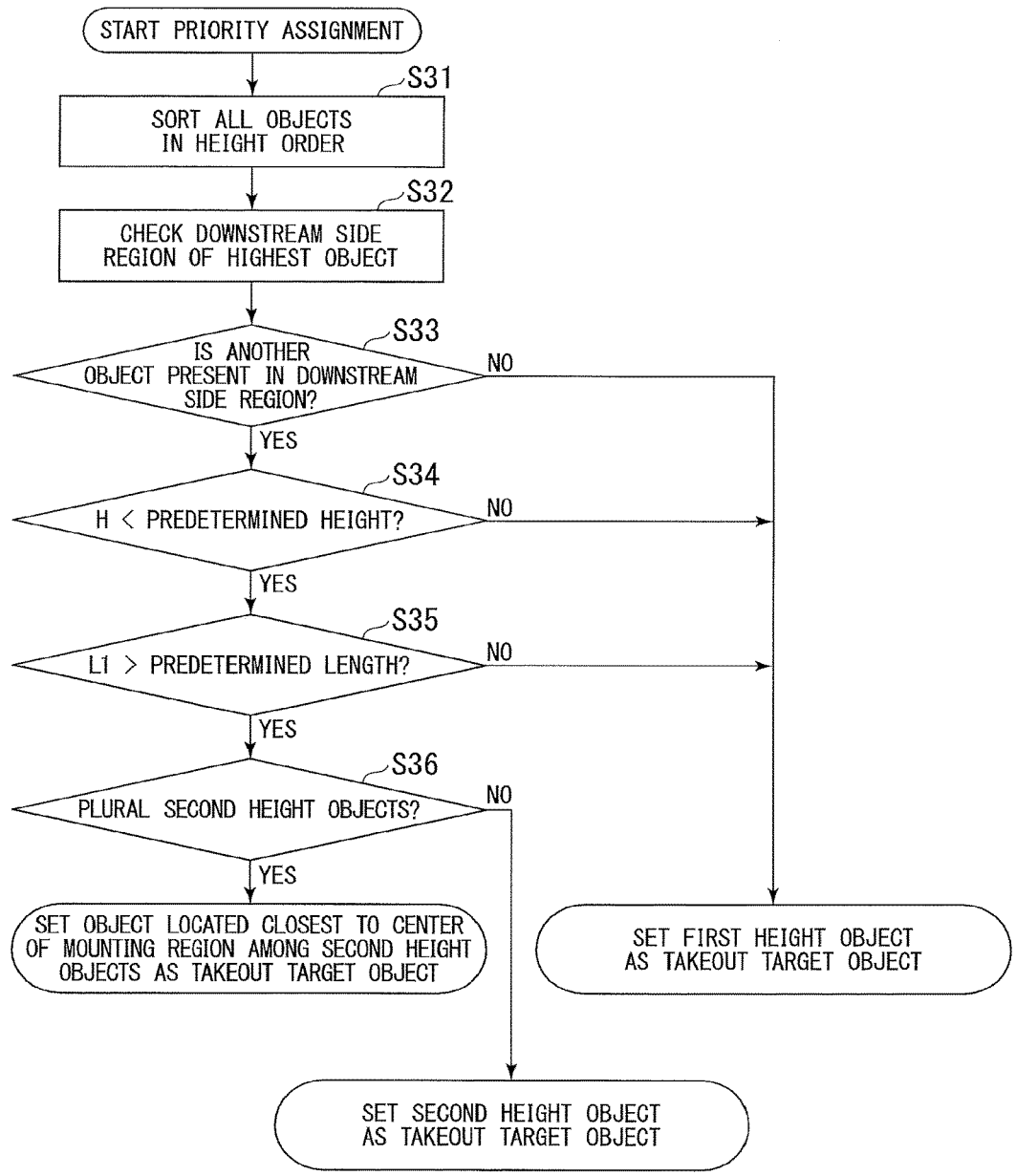
FIG. 17 is a flowchart showing an example of a flow of a conveying method according to the second embodiment.

FIG. 17 is a flowchart showing an example of a conveying method according to the present embodiment. The operation to be described later (an operation of selecting the takeout target object OM from the first height object 61 and the second height object 62) corresponds to step S11 of the first embodiment.

As shown in FIG. 17, first, the controller 15 recognizes the height order of a plurality of objects M (the plurality of objects M placed in the first mounting region S1) detected by the detector 14 on the basis of the detection result of the detector 14 (step S31). The controller 15 recognizes the first height object 61 having the top surface Ma at the highest position among the plurality of objects M detected by the detector 14.

Subsequently, the controller 15 checks a region on the downstream side of the first height object 61 in the conveying direction (hereinafter the region will be referred to simply as a "downstream side region with respect to the first height object 61") on the basis of the detection result of the detector 14 (step S32). The "check" mentioned in the specification means acquiring necessary information by analyzing information. The controller 15 determines whether another object M is present in the downstream side region of the first height object 61 on the basis of the result of checking the region (step S33). When an object M is not present in the downstream side region of the first height object 61 (step S33: NO), the controller 15 sets the first height object 61 as the takeout target object OM. After that, the controller 15 performs the same process as that of the first embodiment.

On the other hand, when an object M (that is, the second height object 62) is present in the downstream side region of the first height object 61 (step S33: YES), the controller 15 determines whether the height difference H between the top surface Ma of the first height object 61 and the top surface Ma of the second height object 62 is smaller than the predetermined height on the basis of the detection result of the detector 14 (step S34). When the height difference H between the top surface Ma of the first height object 61 and the top surface Ma of the second height object 62 is equal to or larger than the predetermined height (step S34: NO), the controller 15 sets the first height object 61 as the takeout target object OM. After that, the controller 15 performs the same process as in the first embodiment.

On the other hand, when the height difference H between the top surface Ma of the first height object 61 and the top surface Ma of the second height object 62 is smaller than the predetermined height, the controller 15 determines whether the distance L1 in the conveying direction between the downstream side end (for example, the front edge Ms) of the second height object 62 and the downstream side end (for example, the front edge Ms) of the first height object 61 in the conveying direction is larger than the predetermined length (step S35). When the distance L1 in the conveying direction between the downstream side end of the second height object 62 and the downstream side end of the first height object 61 is equal to or smaller than the predetermined length (step S35: NO), the controller 15 sets the first height object 61 as the takeout target object OM. After that, the controller 15 performs the same process as that of the first embodiment. On the other hand, when the distance L1 in the conveying direction between the downstream side end of the second height object 62 and the downstream side end of the first height object 61 is larger than the predetermined length, the controller 15 determines whether the plurality of second height objects 62 is present (step S36). Steps S34 and S35 may be executed in a reverse order and may be executed at the same time.

When only one second height object 52 is present (step S36: NO), the controller 15 sets the second height object 62 as the takeout target object OM. After that, the controller 15 performs the same process as that of the first embodiment. On the other hand, when a plurality of second height objects 62 is present (step S36: YES), the controller 15 sets the second height object 62 located closest to the center of the first mounting region S1 among the plurality of second height objects 62 as the takeout target object OM. After that, the controller 15 performs the same process as that of the first embodiment.

According to such a configuration, it is possible to further accelerate the takeout of the object M.

Here, even when a plurality of objects are stacked in a complex manner, by holding an object having the top surface at the highest position and raising the object sufficiently high above, it is possible to take out a plurality of objects sequentially. However, there may be a case in which it is better to not raise a relatively heavy object to a height higher than necessary. Moreover, when there is an object that obviously protrudes toward the front side, by taking out the object on the front side as a person does, it is possible to easily accelerate the takeout of the objects and to improve safety.

Therefore, in the present embodiment, the detector 14 detects the first object (for example, the first height object 61) and the second object (for example, the second height object 62) having the top surface Ma at a lower position than the top surface Ma of the first object at a position on the downstream side of the first object in the conveying direction (for example, the −X direction) of the first object. The controller 15 determines the second object as the takeout target object OM which is taken out earlier than the first object on the basis of the detection result of the detector 14 when at least one of the conditions that the height difference H between the top surface Ma of the first object and the top surface Ma of the second object is smaller than a predetermined height and that the distance L1 in the conveying direction between the downstream side end (for example, the front edge Ms) of the second object and the downstream side end (for example, the front edge Ms) of the first object in the conveying direction is larger than a predetermined length is satisfied.

That is, for example, the controller 15 determines whether it is safe if the second height object 62 is taken out earlier than the first height object 61 on the basis of at least one of the height difference H between the top surface Ma of the first height object 61 and the top surface Ma of the second height object 62 and the distance L1 in the conveying direction between the downstream side end of the second height object 62 and the downstream side end of the first height object 61. For example, when the height difference H between the top surface Ma of the first height object 61 and the top surface Ma of the second height object 62 is smaller than the predetermined height, it can be determined that it is less likely that the first height object 61 is stacked on the second height object 62. Similarly, when the distance L1 in the conveying direction between the downstream side end of the second height object 62 and the downstream side end of the first height object 61 is larger than the predetermined length, it can be determined that it is less likely that the first height object 61 is stacked on the second height object 62. That is, in the present embodiment, using at least one of the two conditions, it is possible to determine with high accuracy whether it is safe even if the second height object 62 is taken out earlier than the first height object 61. In this way, by taking out the second height object 62 earlier than the first height object 61, it is possible to take out all objects M with a smaller number of avoiding operations. In this way, it is possible to further accelerate the takeout of the objects M.

From another viewpoint, the detector 14 detects the first object (for example, the first height object 61) and the second object (for example, the second height object 62) having at least the exposed portion Me exposed to the outside in the downstream side region with respect to the first object in the conveying direction (for example, the −X direction) of the first object and having the top surface Ma at a lower position than the top surface Ma of the first object. The controller 15 determines the second object as the takeout target object OM which is taken out earlier than the first object on the basis of the detection result of the detector 14 when at least one of the conditions that the height difference between the top surface Ma of the first object and the top surface Ma of the second object is smaller than the predetermined height and that the length L2 of the exposed portion Me of the second object in the conveying direction is larger than the predetermined length is satisfied. With such a configuration, it is possible to determine with high accuracy whether it is safe even if the second height object 62 is taken out earlier than the first height object 61 similarly to the above. In this way, it is possible to further accelerate the takeout of the objects M.

In the present embodiment, the controller 15 determines the second object as the takeout target object OM which is taken out earlier than the first object when both of the two conditions are satisfied. That is, in the present embodiment, by performing double-checking using the two conditions, it is possible to check with higher accuracy whether it is safe even if the second height object 62 is taken out earlier than the first height object 61.

In the present embodiment, the plurality of objects M include the third object (another second height object 62). The third object has the top surface Ma substantially at the same height as the top surface Ma of the second object at a position on the downstream side with respect to the first object in the conveying direction of the first object. The controller 15 determines an object located closer to the center of the mounting region S1 among the second and third objects as the takeout target object OM which is taken out earlier than the other of the second and third objects when the distance L1 in the conveying direction between the downstream side end (for example, the front edge Ms) of the third object and the downstream side end (the front edge Ms) of the first object in the conveying direction of the first object is larger than the predetermined length. In other words, the controller 15 determines an object located closer to the center of the mounting region S1 among the second and third objects as the takeout target object OM which is taken out earlier than the other of the second and third objects when the length L2 of the exposed portion of the third object in the conveying direction is larger than the predetermined length.

According to such a configuration, the object M located near the center of the first mounting region S1, for example, is taken out earlier. Due to this, the object M positioned near the center of the first mounting region S1 can be removed relatively earlier. When the object M near the center of the first mounting region S1 can be removed, it is possible to further reduce the movement amount for the avoiding operation of avoiding other objects M. In this way, it is possible to further accelerate the takeout of the objects M.

The conveying method according to the present embodiment includes detecting the first object (for example, the first height object 61) and the second object (for example, the second height object 62) located on the downstream side of the first object in the conveying direction (for example, the −X direction) of the first object and having the top surface at a lower position than the top surface Ma of the first object. Moreover, the conveying method according to the present embodiment includes determining the second object as the takeout target object OM that is taken out earlier than the first object when at least one of the conditions that the height difference H between the top surface Ma of the first object and the top surface Ma of the second object is smaller than the predetermined height and that the distance L1 in the conveying direction between the downstream side end (for example, the front edge Ms) of the second object and the downstream side end (for example, the front edge Ms) of the first object in the conveying direction is larger than a predetermined length is satisfied.

From another viewpoint, the conveying method according to the present embodiment includes detecting the first object (for example, the first height object 61) and the second object (for example, the second height object 62) having at least the exposed portion Me exposed to the outside in the downstream side region of the first object in the conveying direction (for example, the −X direction) of the first object and having the top surface Ma at a lower position than the top surface Ma of the first object. The conveying method according to the present embodiment includes determining the second object as the takeout target object OM which is taken out earlier than the first object when at least one of the conditions that the height difference between the top surface Ma of the first object and the top surface Ma of the second object is smaller than the predetermined height and that the length L2 of the exposed portion Me of the second object in the conveying direction is larger than the predetermined length is satisfied.

According to such a configuration, by taking out the second height object 62 earlier than the first height object 61, it is possible to take out all objects M in a smaller number of avoiding operations. In this way, it is possible to further accelerate the takeout of the object M.

Third Embodiment

Next, a third embodiment will be described with reference to FIGS. 18 to 20.

The present embodiment is different from the second embodiment in that an additional determination process is performed when the second height object 62 is selected as the takeout target object OM. Constituent elements other than those described below are the same as the constituent elements of the second embodiment.

Figure 18:
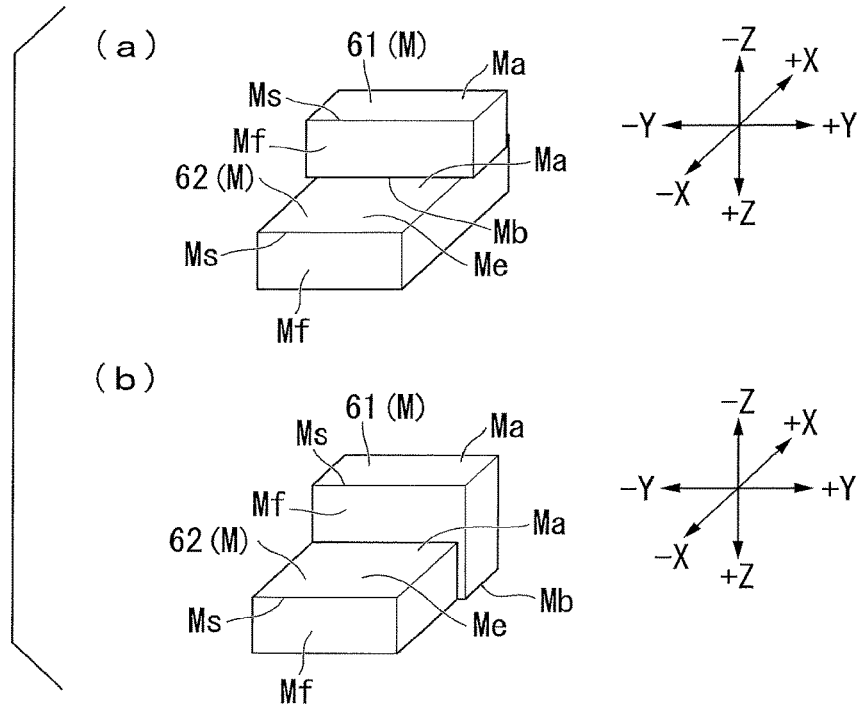
FIG. 18 is a perspective view showing examples of a stacking state of objects according to a third embodiment.

FIG. 18 shows some examples of the stacking state of the objects M.

In the example shown in (a) in FIG. 18, a relatively thin first height object 61 is stacked on a second height object 62 that is relatively long in the +X direction. On the other hand, in the example shown in (b) in FIG. 18, first and second height objects 61 and 62 are arranged in the +X direction.

In the example shown in (a) in FIG. 18, when the second height object 62 is to be taken out earlier than the first height object 61, the first height object 61 falls from the second height object 62. Due to this, in the example shown in (a) in FIG. 18, the first height object 61 has to be taken out earlier than the second height object 62. On the other hand, in the example shown in (b) in FIG. 18, there may be a case in which the time for taking out the first and second height objects 61 and 62 is shortened by taking out the second height object 62 earlier than the first height object 61. However, it may be difficult to determine the state shown in (a) in FIG. 18 and the state shown in (b) in FIG. 18 based on the image information acquired by an existing 3-dimensional measurement technology. Therefore, the controller 15 of the present embodiment may determine the state shown in (a) in FIG. 18 with high accuracy and the state shown in (b) in FIG. 18 by adding another determination condition.

Figure 19:
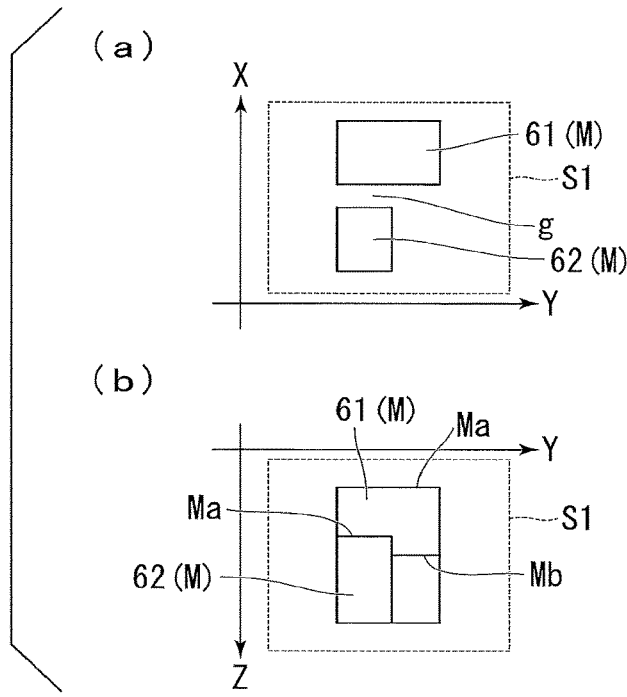
FIG. 19 is a diagram schematically showing a method of determining the stacking state of objects according to the third embodiment.

FIG. 19 schematically shows a method for determining the stacking state of the object M.

First, a first example of the determination condition will be described.

(a) in FIG. 19 shows a first example of the determination condition. In the first example, the controller 15 determines the presence of a gap g between the first height object 61 and the second height object 62 on the basis of the image information of a top view of the first mounting region S1 acquired by the first detector 14A. The controller 15 determines that the first and second height objects 61 and 62 are arranged in a front-rear direction when the gap g is detected between the first height object 61 and the second height object 62.

Next, a second example of the determination condition will be described.

(b) in FIG. 19 shows a second example of the determination condition. In the second example, the controller 15 determines whether the bottom surface Mb of the first height object 61 is present at a different height from the top surface Ma of the second height object 62 on the basis of the image information of a front view of the plurality of objects M acquired by the second detector 14B. That is, depending on the stacking state, there is a case in which it is possible to detect a lower part of the first height object 61 on the rear side of the second height object 62. The controller 15 determines that the first and second height objects 61 and 62 are arranged in the front-rear direction when the base (the bottom surface) Mb of the first height object 61 is detected at a lower position than the top surface Ma of the second height object 62 in a horizontal attitude. The image information used in the second example is not limited to the image information of the front view of the plurality of objects M and may be the image information of a side view or a rear view of the plurality of objects M. That is, the image information used in the second example may be an image information acquired by a detector, in which the plurality of objects M is included in a horizontal field of view.

Next, a third example of the determination condition will be described.

Here, although the conveying device 1 performs the raising operation while holding the takeout target object OM, there may be a case in which it is not possible to detect the base (the bottom surface) Mb of the takeout target object OM even when the takeout target object OM is raised up to a movable limit (the lifting limit of the holder 13) of the arm 12. In this case, the controller 15 returns the takeout target object OM to an original position and sets another object M as the takeout target object OM again. In this case, the controller 15 stores the history of the objects M which have been returned to an original position after takeout has been performed thereon once as history information. In the third example, the controller 15 determines that the first and second height objects 61 and 62 are arranged in the front-rear direction when the history information is detected for the first height object 61 when the takeout target object OM is selected.

Figure 20:
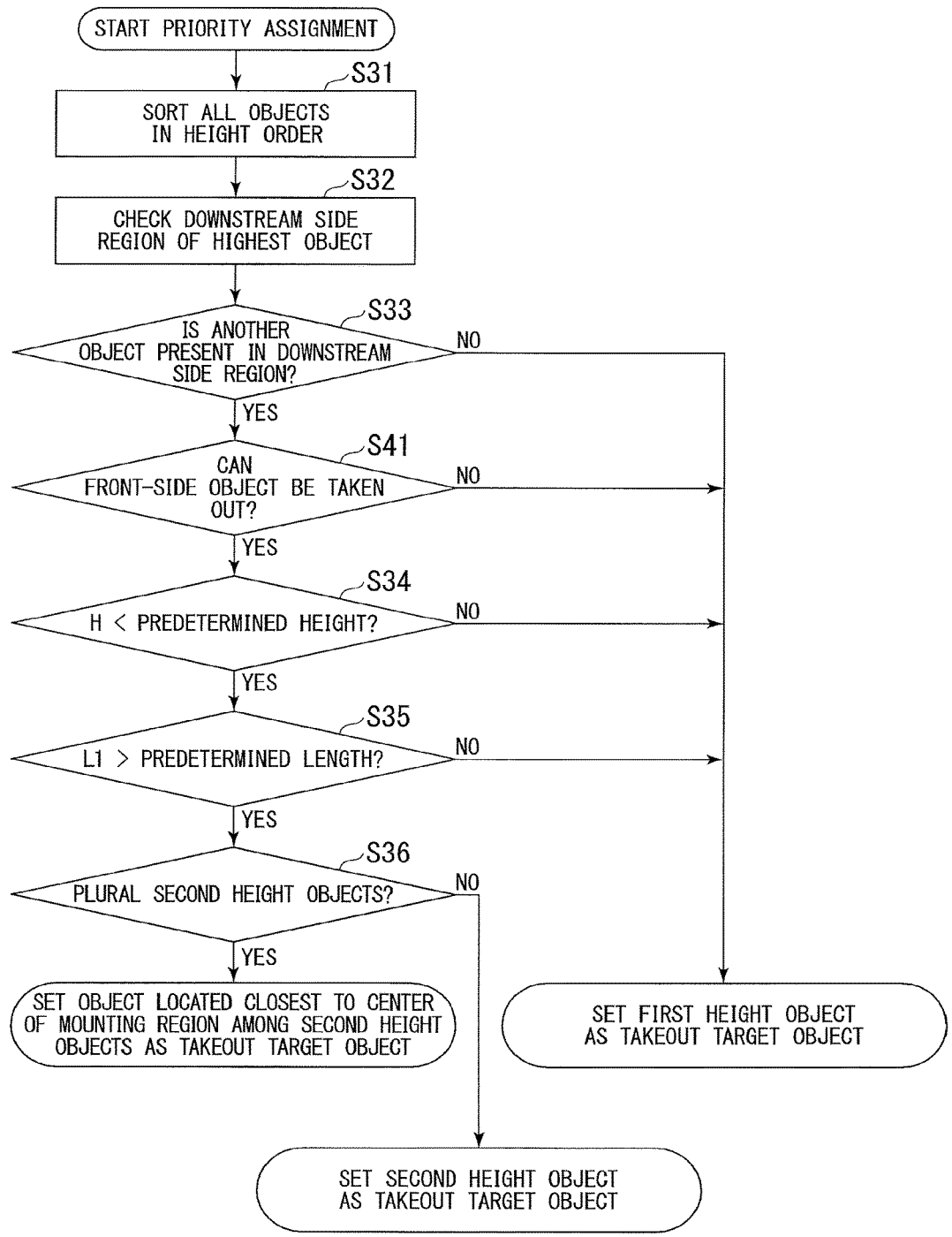
FIG. 20 is a flowchart showing an example of a flow of a conveying method according to the third embodiment.

FIG. 20 is a flowchart showing an example of the conveying method according to the present embodiment.

The conveying method of the conveying device 1 of the present embodiment further includes step S41 of performing a determination process using the determination condition between step S33 and step S34 of the conveying method according to the second embodiment. Since portions other than step S41 are the same as those of the conveying method of the second embodiment, detailed description thereof will be omitted.

As shown in FIG. 20, in the present embodiment, the controller 15 determines whether it is possible to take out the second height object 62 when the second height object 62 is detected in the downstream side region of the first height object 61 (step S41). Specifically, the controller 15 determines whether the first and second height objects 61 and 62 are arranged in the front-rear direction on the basis of the first to third examples of the determination condition. When it is determined that the first and second height objects 61 and 62 are arranged in the front-rear direction using one or more determination conditions included in the three examples (step S41: YES), the controller 15 sets the second height object 62 as the takeout target object OM. On the other hand, when it is determined that the first and second height objects 61 and 62 are not arranged in the front-rear direction using any one of the determination conditions included in the three examples (step S41: NO), the controller 15 sets the first height object 61 as the takeout target object OM.

According to such a configuration, it is possible to determine the stacking state of the first and second height objects 61 and 62 with higher accuracy than in the second embodiment. In this way, it is possible to further accelerate the takeout of the objects M while enhancing the reliability of the conveying device 1 further.

Next, modifications of the first to third embodiments will be described. Constituent elements other than those described below in this modification are substantially the same as the constituent elements of any one of the first to third embodiments.

Figure 21:
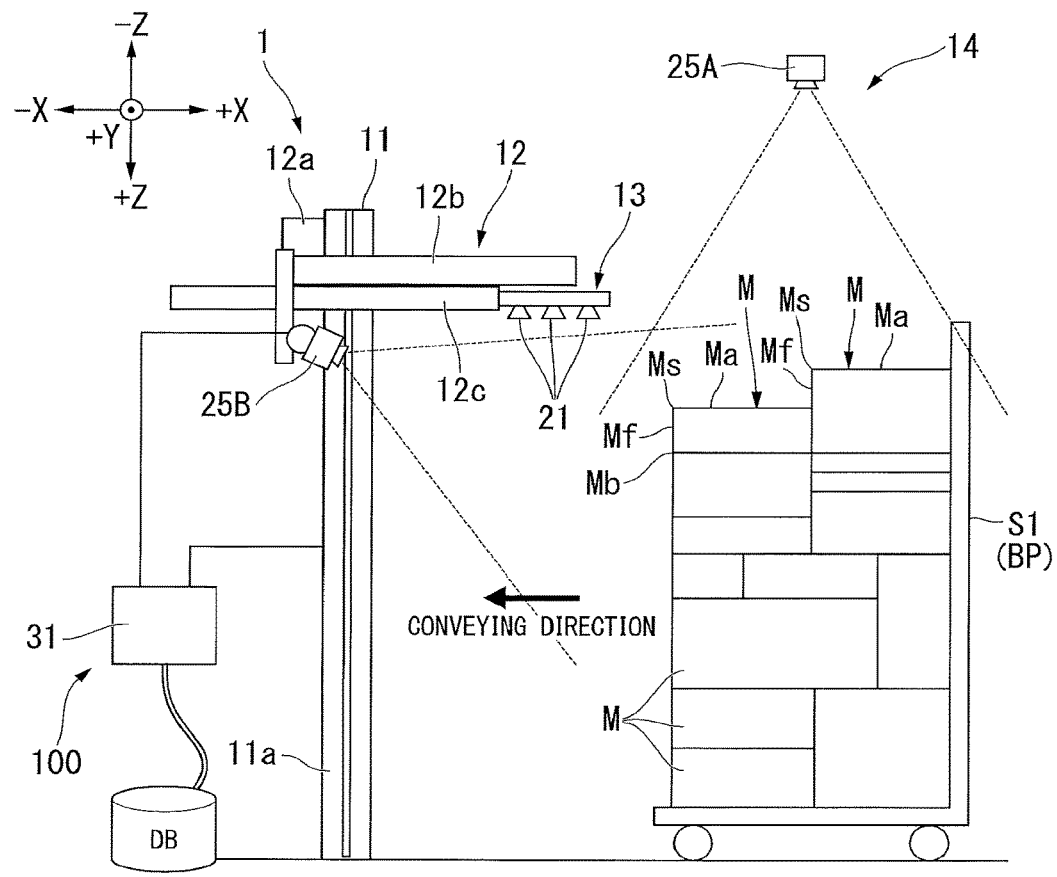
FIG. 21 is a side view showing a conveying device according to a modification of the embodiments.
Figure 22:
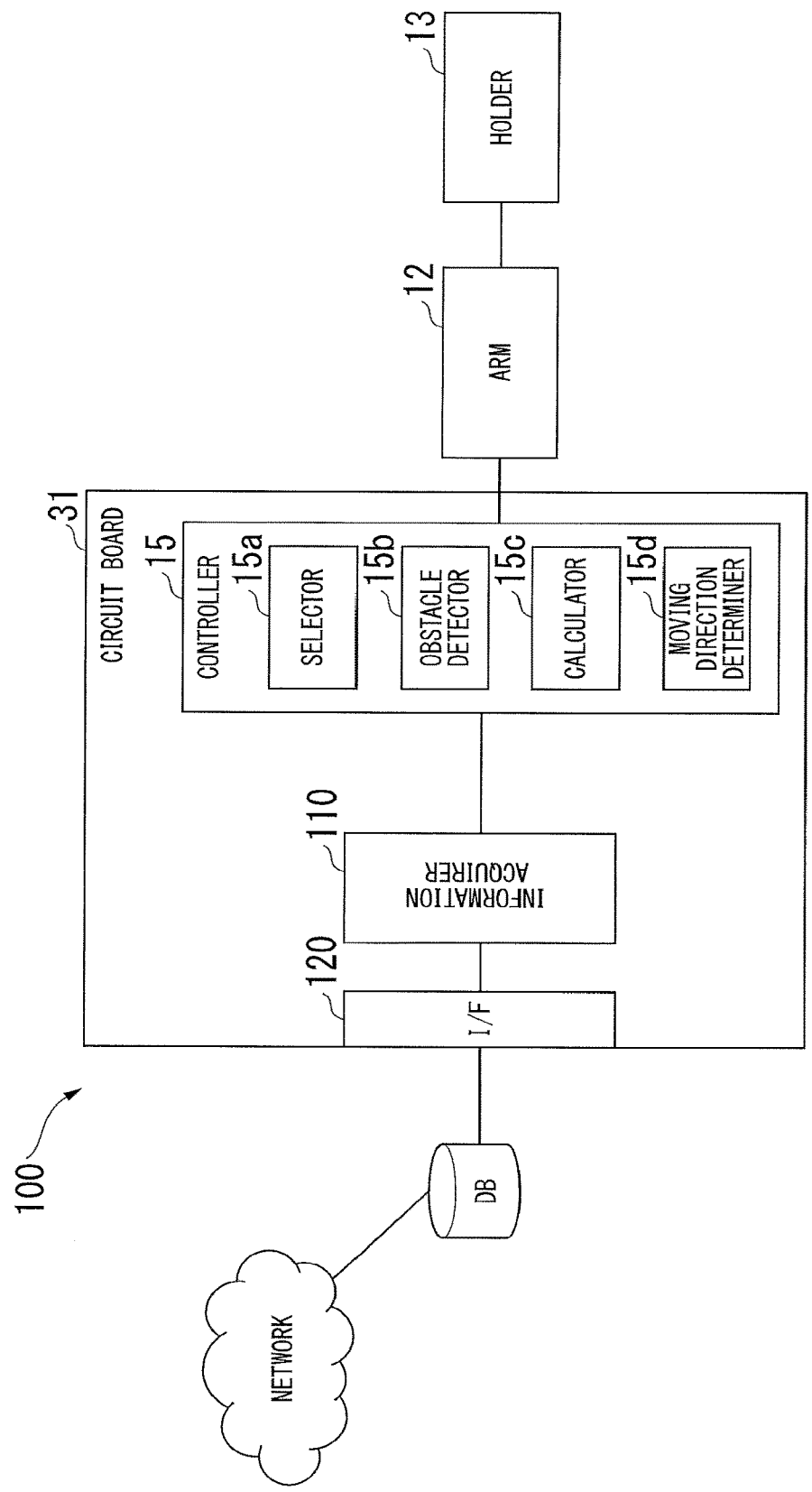
FIG. 22 is a block diagram showing a system configuration of a conveying device according to the modification of the embodiments.

FIG. 21 is a side view showing the conveying device 1 of this modification. FIG. 22 is a block diagram showing a system configuration of the conveying device 1 of this modification. In FIG. 21, the conveyor 16 is not shown for the sake of convenience.

As shown in FIG. 22, the conveying device 1 of this modification has an information acquirer 110. The information acquirer 110 is a software functional unit realized when a processor such as a CPU executes a program stored in a memory of the circuit board 31. Alternatively, the information acquirer 110 may be realized by hardware such as a LSI, ASIC, or FPGA mounted on the circuit board 31. Moreover, the information acquirer 110 may be realized by a combination of a software functional unit and hardware. The information acquirer 110 can connect to a database DB via an interface 120 and a cable or wirelessly. The expression "acquire information" mentioned in the specification is not limited to a case of acquiring information actively and includes a case of acquiring information passively.

The database DB stores information on a plurality of objects M including the first object, the second object, and the third object and information on an obstacle (for example, the pole P). That is, the "information on the object" mentioned in the specification is not limited to information detected during conveying of the object M and may be information given in advance. For example, the "information on the object" stored in the database DB may include at least one of a camera video, cargo tag information, and trajectory information of a loading robot when shipping of the object M is created (for example, when the object M is collected or loaded). The camera video is a video from which the stacking state of a plurality of objects M can be understood, such as a video in which the process of stacking the plurality of objects M is captured, for example The cargo tag information is information stored in an IC tag (for example, a radio frequency identifier (RFID)) attached to each object M, for example. The cargo tag information may include size information of an object M and information indicating a stacking position of the object M or a stacking order of the object M, for example. The trajectory information of the robot may include position information and height information of the robot arm when each object M is stacked and information on the order of stacked objects M. The controller 15 can predict the stacking state of a plurality of objects M which have been stacked and conveyed by obtaining such information from the database DB with the aid of the information acquirer 110.

Here, the controller 15 may acquire the information on the object M described above before the object M is actually conveyed. In this case, the controller 15 can determine a takeout order and a takeout path of the object M according to the above-described rules in advance before the object M is actually conveyed. In this way, it is possible to reduce the amount of calculation performed when the object M is actually taken out on a realtime basis and to finish the processing more quickly. Moreover, the database DB may include object destination information, object type information, and the like. In this case, the controller 15 may change a hold release position (a grip release position) of the holder 13 for each destination of the object M on the basis of the object destination information. In this way, it is possible to convey the objects M more smoothly to each destination of the objects M. Moreover, the controller 15 may change a method of holding the object M by the holder 13, the moving speed of the arm 12, and the like on the basis of the object type information. The object type information may include information on a softness, a vulnerability, a weight, and the like of the object M, for example. For example, when the object M is soft and vulnerable, the controller 15 may decrease the force of holding the object M by the holder 13. Moreover, when the object M is soft, vulnerable, and heavy, the controller 15 may decrease the moving speed of the arm 12. In this way, it is possible to process the object M more appropriately.

The information stored in the database DB is not limited to the information on the object M. The database DB may include information on the shape of the first mounting region S1, the number of segments of the region, a region type, and a portion (for example, a fall prevention bar) S 1a serving as an obstacle when taking out the object M.

Figure 23:
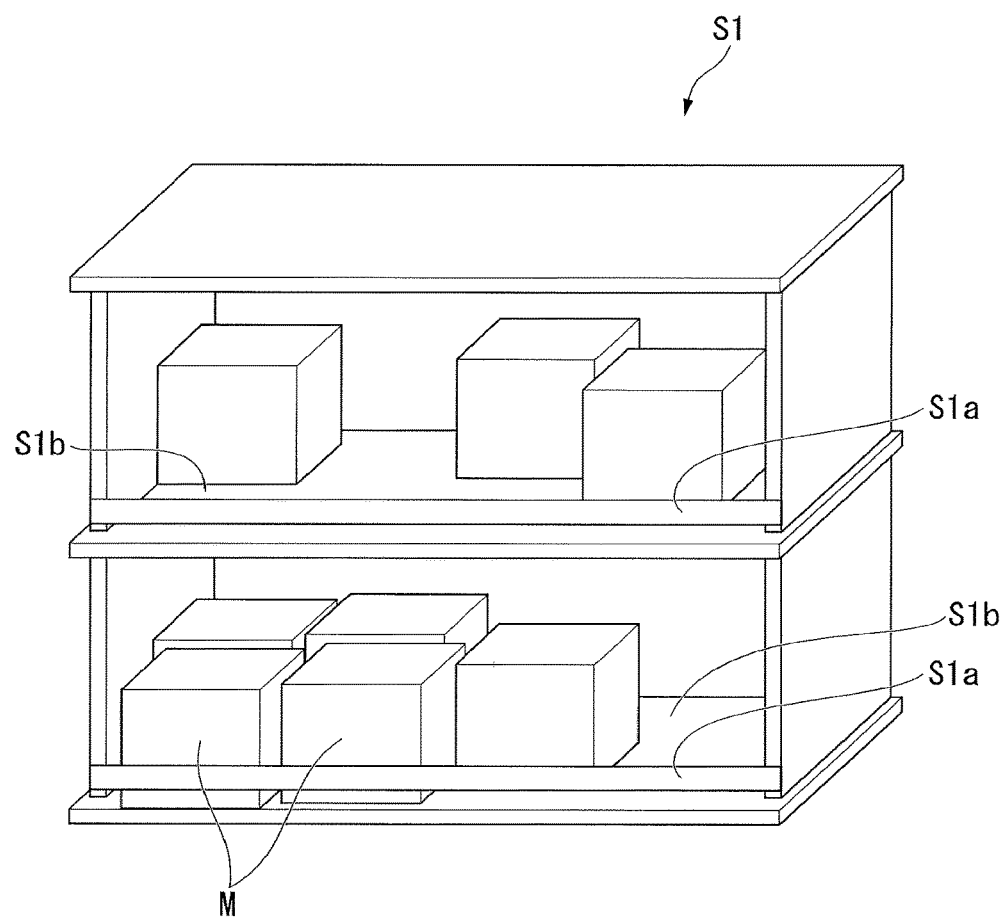
FIG. 23 is a perspective view showing an example of a first mounting region according to the modification of the embodiments.

FIG. 23 is a perspective view showing an example of the first mounting region S1 according to a modification of the embodiment.

As shown in FIG. 23, the number of segments of the first mounting region S1 is the number of segmented regions S1b when the first mounting region S1 is segmented into a plurality of regions S1b. The region type is information indicating the type of the object M when objects M of different types are stacked in respective regions S1b. The portion S1a serving as an obstacle when taking out the object M is a portion positioned on the downstream side of the object M in the conveying direction of the object M. The controller 15 may changes a holding method (for example, a holding force) of the holder 13 and a moving path, a moving speed, and the like of the arm 12 on the basis of the information on the shape of the first mounting region S1, the number of segmented regions, the region type, and the portion S1a serving as an obstacle when taking out the object M.

When the information acquirer 110 as in this modification is provided, the detector 14 including a sensor of a camera or the like may be omitted. However, when the detector 14 is used together with the information acquirer 110, the controller 15 may adjust the holding position (gripping position) and the holding force (gripping force) of the holder 13 on the basis of the detection result of the detector 14. For example, it is conceivable that an attitude of the object M which is stacked accurately by a robot hand or the like may change slightly due to vibration during conveying. For example, this may occur when a large gap is formed between the object M and a partition of a wall that forms the first mounting region S1. In order to cope with such a situation, the controller 15 detects a difference between the information obtained from the database DB and the actual information obtained by the detector 14 and adjusts the holding position (the gripping position) and the holding force (the gripping force) of the holder 13 so as to correct the difference in addition to quick determination of the takeout trajectory and the selection of the takeout target object M obtained by referring to the database DB. In this way, it is possible to convey the objects more accurately. Moreover, when a significant change in attitude of the object M (for example, collapsing of cargo) is detected by the detector 14, the controller 15 may cause an alarm device to output an alarm to call an operator. Moreover, when a significant difference in attitude of the objects M (for example, collapsing of cargo) is detected by the detector 14, the controller 15 can take countermeasures appropriate for each stacking state safely by changing an operation mode to a cargo collapse processing mode (for example, a low speed mode). Moreover, the controller 15 uploads the recognition information (for example, the detection result of the detector 14) used when the objects M was taken out and the trajectory information of the arm 12 and the holder 13 to the database DB via the interface 120. In this way, it is possible to understand an operating state of the entire conveying system and to manage individual items of cargo easily.

The conveying system 100 of this modification includes the moving direction determiner 15d similarly to the first embodiment. In this way, it is possible to accelerate the takeout of the objects M and to improve the safety. Some or all of the conveying systems 100 according to the first to third embodiments and the modifications thereof are a software functional unit realized when a processor such as a CPU executes a program. Alternatively, some or all of the conveying systems 100 may be realized by hardware such as a LSI, ASIC, or FPGA. Moreover, some or all of the conveying systems 100 may be realized by a combination of the software functional unit and hardware. For example, some or all of the conveying systems 100 may be provided independently (physically separately) from the conveying device 1. For example, some or all of the conveying systems 100 may be provided as part of a management system of a logistics center. For example, some or all of the conveying systems 100 may be provided as a system that functions via a network such as the Internet.

While the conveying device and the conveying method according to the first to third embodiments have been described, the embodiments are not limited to the above examples. For example, the first and second direction for avoiding the first and second objects are not limited to the substantially vertical direction and the substantially horizontal direction and may be directions that obliquely cross each other.

According to at least one of the embodiments described above, a conveying device includes an information acquirer and a controller. The information acquirer is configured to acquire at least information on a first object and a second object. The controller is configured to determine a moving direction of a holder holding the first object based on the information acquired by the information acquirer on the basis of an overlapping width in a first direction between the first object and the second object on a projection plane viewed in a direction substantially parallel to a conveying direction of the first object and an overlapping width in a second direction crossing the first direction between the first object and the second object on the projection plane. According to such a configuration, it is possible to accelerate the takeout of objects.

Hereinafter, several examples of the conveying device, the conveying system and the conveying method will be described.

[A1] A conveying device including:
a detector configured to detect a first object and a second object; and
a controller configured to calculate a first movement amount for moving the first object in a first direction to avoid the second object and a second movement amount for moving the first object in a second direction crossing the first direction to avoid the second object by referring to a detection result of the detector in a case where the second object is positioned in a conveying direction of the first object with respect to the first object, and to determine a moving direction of a holder holding the first object on the basis of comparison between the first movement amount and the second movement amount.

[A2] The conveying device according to [A1], wherein
the detector is configured to detect a plurality of objects including the first object and the second object, and
the second object is an object having a top surface at the highest position among objects positioned in the conveying direction of the first object with respect to the first object among the plurality of objects.

[A3] The conveying device according to [A2], wherein
the plurality of objects includes a third object having a top surface at a position that is lower than a top surface of the second object and higher than a bottom surface of the first object, and
the controller is configured to calculate the first movement amount and the second movement amount in a state in which the bottom surface of the first object is raised up to a height above the top surface of the third object and determines the moving direction of the holder holding the first object on the basis of comparison between the first movement amount and the second movement amount.

[A4] The conveying device according to [A3], wherein
the plurality of objects includes a plurality of surrounding objects placed in at least one of a front region positioned in the conveying direction with respect to the first object and lateral regions positioned on both sides of the front region and on both sides of the first object in a direction crossing the conveying direction, and
the third object is an object having the top surface at the next highest position after the second object among the plurality of surrounding objects.

[A5] The conveying device according to any one of [A1] to [A4], wherein
the detector is configured to detect an obstacle including a portion positioned above a top surface of the second object, and
the controller is configured to calculate a third movement amount for moving the first object in the first direction to avoid the obstacle and a fourth movement amount for moving the first object in the second direction to avoid the obstacle instead of the first movement amount and the second movement amount in a case where the obstacle is detected by the detector and to determine a moving direction of the holder holding the first object on the basis of comparison between the third movement amount and the fourth movement amount.

[A6] The conveying device according to [A1], wherein
the second object has a top surface at a lower position than a top surface of the first object, the position being on a downstream side with respect to the first object in the conveying direction, and
the controller is configured to determine the second object as a takeout target object which is taken out earlier than the first object in a case where at least one of the conditions that a height difference between the top surface of the first object and the top surface of the second object is smaller than a predetermined height and that a distance in the conveying direction between a downstream side end of the second object and a downstream side end of the first object in the conveying direction is larger than a predetermined length is satisfied.

[A7] The conveying device according to [A6], wherein
the controller is configured to determine the second object as the takeout target object which is taken out earlier than the first object in a case where the height difference between the top surface of the first object and the top surface of the second object is smaller than the predetermined height and the distance in the conveying direction between the downstream side end of the second object and the downstream side end of the first object in the conveying direction is larger than the predetermined length.

[A8] A conveying method including:
detecting a first object and a second object;
calculating a first movement amount for moving the first object in a first direction to avoid the second object and a second movement amount for moving the first object in a second direction crossing the first direction to avoid the second object in a case where the second object is positioned in a conveying direction of the first object with respect to the first object; and
determining a moving direction of moving the first object on the basis of comparison between the first movement amount and the second movement amount.

[A9] A conveying device including:
a detector configured to detect a first object and a second object, the second object having a top surface at a lower position than a top surface of the first object, the position being on a downstream side of the first object in a conveying direction of the first object; and
a controller configured to determine the second object as a takeout target object which is taken out earlier than the first object on the basis of a detection result of the detector in a case where at least one of the conditions that a height difference between the top surface of the first object and the top surface of the second object is smaller than a predetermined height and that a distance in the conveying direction between a downstream side end of the second object and a downstream side end of the first object in the conveying direction is larger than a predetermined length is satisfied.

[A10] A conveying method including:

detecting a first object and a second object, the second object having a top surface at a lower position than a top surface of the first object, the position being on a downstream side of the first object in a conveying direction of the first object; and determining the second object as a takeout target object which is taken out earlier than the first object in a case where at least one of the conditions that a height difference between the top surface of the first object and the top surface of the second object is smaller than a predetermined height and that a distance in the conveying direction between a downstream side end of the second object and a downstream side end of the first object in the conveying direction is larger than a predetermined length is satisfied.

[A11] conveying device including:

a detector configured to detect a first object and a second object, the second object including at least an exposed portion exposed to the outside in a downstream side region of the first object in a conveying direction of the first object, the second object having a top surface at a lower position than a top surface of the first object; and a controller configured to determine the second object as a takeout target object which is taken out earlier than the first object on the basis of a detection result of the detector in a case where at least one of the conditions that a height difference between the top surface of the first object and the top surface of the second object is smaller than a predetermined height and that a length of the exposed portion of the second object in the conveying direction is larger than a predetermined length is satisfied.

[B1] A conveying device comprising:

an information acquirer configured to acquire information related to at least a first object and a second object; and a controller configured to determine a moving direction of a holder holding the first object, based on the information acquired by the information acquirer, in a case where the second object is positioned in a conveying direction of the first object with respect to the first object on the basis of an overlapping width in a first direction between the first object and the second object on a projection plane viewed in a direction substantially parallel to the conveying direction and an overlapping width in a second direction crossing the first direction between the first object and the second object on the projection plane.

[B2] A conveying system comprising:

a determiner configured to determine a moving direction of a holder holding a first object on the basis of an overlapping width in a first direction between the first object and a second object on a projection plane viewed in a direction substantially parallel to the conveying direction and an overlapping width in a second direction crossing the first direction between the first object and the second object on the projection plane in a case where the second object is positioned in the conveying direction of the first object with respect to the first object, the overlapping width in the first direction and the overlapping width in the second direction being based on information on the first object and the second object.

[B3] A conveying method comprising:

determining a moving direction of a holder holding a first object on the basis of an overlapping width in a first direction between the first object and a second object on a projection plane viewed in a direction substantially parallel to the conveying direction and an overlapping width in a second direction crossing the first direction between the first object and the second object on the projection plane in a case where the second object is positioned in the conveying direction of the first object with respect to the first object, the overlapping width in the first direction and the overlapping width in the second direction being based on information on the first object and the second object.

[B4] A conveying device comprising:

an information acquirer configured to acquire information on a first object and a second object, the second object having a top surface at a lower position than a top surface of the first object, the position being on a downstream side of the first object in a conveying direction of the first object; and a controller configured to determine the second object as a takeout target object which is taken out earlier than the first object on the basis of the information acquired by the information acquirer in a case where at least one of the conditions that a height difference between the top surface of the first object and the top surface of the second object is smaller than a predetermined height and that a distance in the conveying direction between a downstream side end of the second object and a downstream side end of the first object in the conveying direction is larger than a predetermined length is satisfied.

[B5] A conveying method comprising:

acquiring information on a first object and a second object, the second object having a top surface at a lower position than a top surface of the first object, the position being on a downstream side of the first object in a conveying direction of the first object; and determining the second object as a takeout target object which is taken out earlier than the first object when at least one of the conditions that a height difference between the top surface of the first object and the top surface of the second object is smaller than a predetermined height and that a distance in the conveying direction between a downstream side end of the second object and a downstream side end of the first object in the conveying direction is larger than a predetermined length is satisfied.

[B6] A conveying device comprising:

an information acquirer configured to acquire information related to a first object and a second object, the second object including at least an exposed portion exposed to the outside in a downstream side region of the first object in the conveying direction, the second object having a top surface at a lower position than a top surface of the first object; and a controller configured to determine the second object as a takeout target object which is taken out earlier than the first object on the basis of the information acquired by the information acquirer when at least one of the conditions that a height difference between the top surface of the first object and the top surface of the second object is smaller than a predetermined height and that a length of the exposed portion of the second object in the conveying direction is larger than a predetermined length is satisfied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conveying device comprising:
a controller configured to determine a moving direction of a holder holding a first object based on a state of overlapping between the first object and a second object viewed in a conveying direction of the first object in a case where the second object is positioned in the conveying direction of the first object with respect to the first object.

2. The conveying device according to claim 1, wherein
the controller is configured to determine the moving direction of the holder holding the first object based on a first overlapping width between the first object and the second object and a second overlapping width between the first object and the second object, which are viewed in the conveying direction of the first object, the first overlapping width is in a first direction, and the second overlapping width is in a second direction that is different from the first direction.

3. The conveying device according to claim 1, further comprising:
an information acquirer configured to acquire information related to at least the first object and the second object,
wherein the controller is configured to determine the moving direction of the holder holding the first object based on a first overlapping width between the first object and the second object and a second overlapping width between the first object and the second object, the first overlapping width and the second overlapping width are on a projection plane that is viewed in a direction substantially parallel to the conveying direction, the first overlapping width is in a first direction, the second overlapping width is in a second direction that is different from the first direction, the first overlapping width and the second overlapping width are based on the information acquired by the information acquirer.

4. The conveying device according to claim 3, wherein
the controller is configured to move the holder in the first direction if the first overlapping width is smaller than the second overlapping width, and to move the holder in the second direction if the second overlapping width is smaller than the first overlapping width.

5. The conveying device according to claim 3, wherein
the controller comprises:
a calculator configured to calculate the first overlapping width and the second overlapping width based on the information acquired by the information acquirer; and
a determiner configured to determine the moving direction of the holder by comparing the first overlapping width and the second overlapping width which are calculated by the calculator.

6. The conveying device according to claim 3, wherein
the information acquirer is configured to acquire information related to a plurality of objects including the first object and the second object, and
the second object is an object having a top surface at the highest position among objects positioned in the conveying direction of the first object with respect to the first object.

7. The conveying device according to claim 6, wherein
the plurality of objects includes a third object having a top surface positioned at a position that is lower than the top surface of the second object and higher than a bottom surface of the first object, and
the controller is configured to determine the moving direction of the holder based on the first overlapping width and the second overlapping width in a state in which the bottom surface of the first object is raised up to a height higher than the top surface of the third object.

8. The conveying device according to claim 6, wherein
the plurality of objects includes a plurality of surrounding objects placed in at least one of a front region positioned in the conveying direction with respect to the first object and lateral regions positioned on both sides of the front region and on both sides of the first object in a direction different from the conveying direction, and
the third object is an object having a top surface at the highest position among the plurality of surrounding objects except the second object.

9. The conveying device according to claim 3, wherein
the information acquirer is configured to acquire information related to an obstacle including a portion located above a top surface of the second object, and
the controller is configured to determine the moving direction of the holder based on a third overlapping width between the first object and the obstacle and a fourth overlapping width between the first object and the obstacle instead of the first overlapping width and the second overlapping width in a case where the information related to the obstacle is acquired by the information acquirer, the third overlapping width and the fourth overlapping width are on the projection plane, the third overlapping width is in the first direction, and the fourth overlapping width is in the second direction.

10. The conveying device according to claim 3, wherein
the second object has a top surface at a lower position than a top surface of the first object, the position being on a downstream side of the first object in the conveying direction, and
the controller is configured to determine the second object as a takeout target object which is taken out earlier than the first object in a case where at least one of: a first condition that a height difference between the top surface of the first object and the top surface of the second object is smaller than a predetermined height; and a second condition that a distance in the conveying direction between a downstream side end of the second object and a downstream side end of the first object in the conveying direction is larger than a predetermined length is satisfied.

11. The conveying device according to claim 10, wherein
the controller is configured to determine the second object as the takeout target object which is taken out earlier than the first object in a case where the height difference between the top surface of the first object and the top surface of the second object is smaller than the predetermined height and the distance in the conveying direction between the downstream side end of the second object and the downstream side end of the first object in the conveying direction is larger than the predetermined length.

12. The conveying device according to claim 10, further comprising
a conveyor configured to receive the first object taken out by the holder and to convey the first object.

13. A conveying system comprising:
a determiner configured to determine a moving direction of a holder holding a first object based on a state of overlapping between the first object and a second object viewed in a conveying direction of the first object in a case where the second object is positioned in the conveying direction of the first object with respect to the first object.

14. A conveying method comprising:
determining a moving direction of a holder holding a first object based on a state of overlapping between the first object and a second object viewed in a conveying direction of the first object in a case where the second object is positioned in the conveying direction of the first object with respect to the first object.

* * * * *